US012505184B1

(12) United States Patent
Rudish et al.

(10) Patent No.: US 12,505,184 B1
(45) Date of Patent: Dec. 23, 2025

(54) DATA SECURITY FOR DATAFRAMES AS A SERVICE

(71) Applicant: Workday, Inc., Pleasanton, CA (US)

(72) Inventors: Don Rudish, Mountain House, CA (US); Amit Kharb, Leixlip (IE); Ashrita Battepati, Dublin, CA (US); Thiago Fousek Croce, San Jose, CA (US); Yu Wan, Milpitas, CA (US); Thomas Leslie Hassler, Princeton, IL (US)

(73) Assignee: Workday, Inc., Pleasanton, CA (US)

( * ) Notice: Subject to any disclaimer, the term of this patent is extended or adjusted under 35 U.S.C. 154(b) by 93 days.

(21) Appl. No.: 18/161,737

(22) Filed: Jan. 30, 2023

(51) Int. Cl.
   *G06F 21/31* (2013.01)

(52) U.S. Cl.
   CPC ...... *G06F 21/31* (2013.01); *G06F 2221/2141* (2013.01)

(58) Field of Classification Search
   CPC .......................... G06F 21/31; G06F 2221/2141
   See application file for complete search history.

(56) References Cited

U.S. PATENT DOCUMENTS

| | | | |
|---|---|---|---|
| 12,067,007 B1 | 8/2024 | Miller | |
| 2018/0004784 A1* | 1/2018 | Tompkins | G06F 16/22 |
| 2019/0095817 A1 | 3/2019 | Ma | |
| 2021/0097067 A1* | 4/2021 | Virtuoso | G06F 16/2455 |
| 2021/0303576 A1 | 9/2021 | Ouyang | |
| 2023/0259521 A1* | 8/2023 | Haelen | G06F 16/254 |
| | | | 707/602 |
| 2023/0319048 A1* | 10/2023 | Ou | H04L 63/102 |
| | | | 726/7 |

* cited by examiner

Primary Examiner — Farid Homayounmehr
Assistant Examiner — Suman Debnath
(74) Attorney, Agent, or Firm — Cooper Legal Group, LLC

(57) ABSTRACT

The present application discloses a method, system, and computer system for providing a dataframe as a service. The method includes (a) receiving, from a client system, one or more hints identifying parameters for source data; (b) executing a plan for a source dataframe including determining whether accessing the source data for the source dataframe is permitted based at least in part on one or more security policies, wherein the plan is based at least in part on the one or more hints; (c) receiving from the client system a business logic pertaining to a transformation to be applied to the source dataframe; and (d) providing to the client system information pertaining to an execution result obtained based at least in part on the business logic.

25 Claims, 24 Drawing Sheets

400

∨ Query

- ⓘ Details
- 🔍 Suggestions ②
- ▥ Data Sources ①

Data Sources ⤴   ☐ Show 1 used data source only — 450

| Name | Type ▽ |
|---|---|
| portal_xo_modules_internal_users_and_members | Lookup Table |
| ems_cors_cloud_resources | Time Series DB |
| env_instance_inventory | Time Series DB |
| env_s_cors_count | Time Series DB |
| envperf_tenant_history | Time Series DB |
| wta_env_admin_tenants | Time Series DB |
| wta_env_tenants | Time Series DB |
| ac_configurations — 452 | SWH Log |
| ☑ access | SWH Log |
| accounting_center_batch_run_stats | SWH Log |
| accounting_center_batch_stage_stats | SWH Log |

Query name: [Query 1] — 410

Date Range: [2022-10-26] to [2022-11-02] — 420, 430

Row Limit: [5,000] [10,000] [500,000] [No limit]

> Advanced Options — 460

Query — 440

```
1  def applyTransformations (access) :
2    df = access.groupBy("tenant_n", "t
3      .agg (count("swh_env").alias(
4        min("thread_cpu_time").al
5        max("thread_cpu_time").al
6        sum("thread_cpu_time").al
7    return df
8
```

[▶ Save & Run] [✎ Save]    [≡ Format]

| Query Name | donrudisht0q53615714 | | | | α |
|---|---|---|---|---|---|
| Date Range | 2022-10-26 | to | 2022-11-02 | | |
| Row Limit | 5,000 | 10,000 | 500,000 | No limit | |

> Advanced Options

| Environments | Production X | | | |
|---|---|---|---|---|
| Data Centers | All | Custom | | |
| | ASH X | COL X | DUB X | MTL X | ORE X | PDX X |
| | SIN X | WD103 X | WD104 X | WD105 X | | |

Save & Run Options
*Important: These options are cleared after page refresh.*
☐ Generate CSV automatically
☐ Force run
☐ Preserve existing results (0) and schedules (0)

Write to Result | New Result ∨ |

Query
```
1  def applyTransformations(access) :
2      df = access.groupBy("tenant_n" , "task_id" , "task_name" , "common_request_id"} \
3          .agg (count("swh_env").alias("request_count"),\
4              min("thread_cpu_time").alias("min_thread_cpu_time"), \
5              max("thread_cpu_time").alias("max_thread_cpu_time"), \
6              sum("thread_cpu_time").alias("sum_thread_cpu_time")))
7      return df
8
```

FIG. 7 df1 =

| firstname | middlename | lastname | id | gender | salary |
|---|---|---|---|---|---|
| James |  | Smith | 36636 | M | 3000 |
| Michael | Rose |  | 40288 | M | 4000 |
| Robert |  | Williams | 42114 | M | 4000 |
| Maria | Anne | Jones | 39192 | F | 4000 |
| Jen | Mary | Brown |  | F | -1 |

| firstname | middlename | lastname | id | gender | salary |
|---|---|---|---|---|---|
| Mark |  | Smithson | 5553 | M | 1234 |
| George | Noname | Something | 41234 | M | 5678 |

| firstname | middlename | lastname | id | gender | salary |
|---|---|---|---|---|---|
| James |  | Smith | 36636 | M | 3000 |
| Michael | Rose |  | 40288 | M | 4000 |
| Robert |  | Williams | 42114 | M | 4000 |
| Maria | Anne | Jones | 39192 | F | 4000 |
| Jen | Mary | Brown |  | F | -1 |
| Mark |  | Smithson | 5553 | M | 1234 |
| George | Noname | Something | 41234 | M | 5678 |

DATA SECURITY FOR DATAFRAMES AS A SERVICE

BACKGROUND OF THE INVENTION

A system for big data processing comprises a system for deployments of applications, configurations, one or more datasets, and model(s) used in connection with analyzing the data (e.g., collectively a shard). The one or more datasets are accessed by users associated with an organization. For example, users may input queries to a client terminal, and the queries are performed by the system for data processing. At scale, the workload associated with processing the queries is computationally expensive. Accordingly, compute clusters are deployed to process the queries. In connection with analyzing big data, organizations are generally required to have extensive applications that configure resources and query data sources before users associated with the organization can run evaluations/workloads against a dataset.

BRIEF DESCRIPTION OF THE DRAWINGS

Various embodiments of the invention are disclosed in the following detailed description and the accompanying drawings.

FIG. 4 is a diagram of a user interface used in connection with providing a dataframe as a service according to various embodiments of the present application.

FIG. 5 is a diagram of a user interface used in connection with providing a dataframe as a service according to various embodiments of the present application.

FIG. 7 is a diagram user interface used in connection with providing a dataframe as a service according to various embodiments of the present application.

FIG. 8A is a diagram of a dataframe according to various embodiments of the present application.

FIG. 8B is a diagram of a dataframe according to various embodiments of the present application.

FIG. 8C is a diagram of a dataframe according to various embodiments of the present application.

FIG. 10 is a diagram user interface used in connection with providing a dataframe as a service according to various embodiments of the present application.

DETAILED DESCRIPTION

Figure 1:
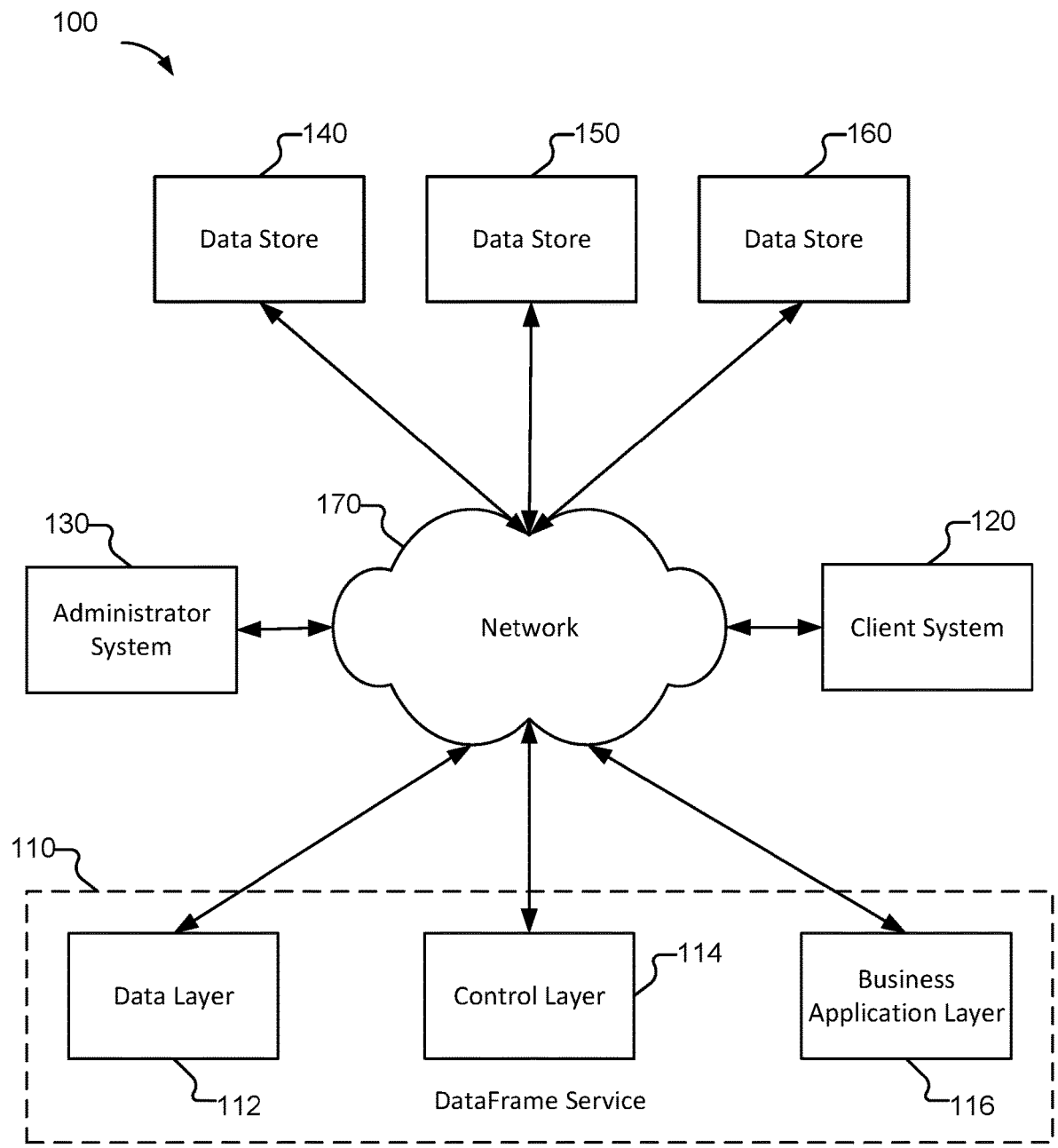
FIG. 1 is a block a diagram of a system for providing a dataframe as a service according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a dataframe may include a logical structure that organizes data into a table, such as a two-dimensional table.

Big data systems allows users to analyze large datasets, such as by running queries against the datasets. Such big data system frameworks implement a dataframe to represent information. For example, because dataframes are highly expressive compared to relational algebra Structured Query Language (SQL) expressions, dataframe implementations have been widely adopted in multiple popular languages such as Scala, Java, Python, and R.

Related art systems require users/organizations to develop one or more applications or microservices to facilitate executing queries/workloads against the datasets. For example, related art systems in which dataframes are implemented with big data frameworks require time consuming complex setups to integrate programing languages, compute platforms, and data source systems. Developers are required to create applications/microservices that monitor a production environment, get aggregates from a set of aggregates, generate a corresponding notebook (e.g., a Jupyter Notebook), and a dataframe is generated for manipulation in connection with execution of a query. Accordingly, related art systems require users to know how to create the entire application, set up a cluster of compute resources (e.g., a Spark cluster, such as by using an analytics engine using Apache Spark™), invoke a connection to the cluster (e.g., a SparkContext), register the access path to point to data source, and then create dataframe. As a result, a developer's or organization's resources and attention is directed at creating the infrastructure for analyzing data rather than devoting their resources and attention to the business logic to evaluate against the applicable datasets.

Some related art systems provide a function as a service in which runtime environments and libraries are provided for customers (e.g., organizations, developers, etc.) call a predefined function (e.g., general purpose functions, etc.) in connection with development of their application. For example, a function simplifies development of an application by externalizing certain components of an application into a service to be called by applications that are developed. An example of a function as a service is a shopping cart function that is predefined and allows developers to call the function in connection with development of their e-commerce site. Functions as a service are predefined functions available to developers to reduce the cost/worry about issues pertaining to the functions.

According to various embodiments, a method, system, and computer system for providing a dataframe as a service is disclosed. The method includes (a) receiving, from a client system, one or more hints identifying parameters for source data, in response to receiving the one or more hints, (b) generating a plan for a source dataframe based at least in part on the one or more hints, (c) receiving from the client system a business logic pertaining to a transformation to be applied to the source dataframe, and (d) providing to the client system information pertaining to an execution result obtained based at least in part on the business logic.

According to various embodiments, a method, system, and computer system for providing a dataframe as a service is disclosed. The method includes (a) receiving, from a client system, one or more hints identifying parameters for source data, in response to receiving the one or more hints, (b) executing a plan for a source dataframe including determining whether accessing the source data for the source dataframe is permitted based at least in part on one or more security policies, wherein the plan is based at least in part on the one or more hints, (c) receiving from the client system a business logic pertaining to a transformation to be applied to the source dataframe, and (d) providing to the client system information pertaining to an execution result obtained based at least in part on the business logic.

Various embodiments abstract away various components, such as the infrastructure (e.g., underlying storage, compute technology, etc.), used in evaluating queries against a dataset. Such abstraction of the infrastructure (e.g., definition/connections to data sources, allocation of resources, management/generation of dataframes, etc.) enables users (e.g., customers, organizations) to devote their attention to the specific business logic to be applied for analysis against a dataset. Accordingly, in contrast to related art systems in which developers create applications used to query datasets, various embodiments enable developers to query datasets based on providing (i) a hint, such as a hint pertaining to a desired data to be evaluated (e.g., against which a computation is to be executed), and (ii) business logic. In response to receiving the hint, the system determines the applicable data source(s). Further, in response to receiving the business logic, the system configures a connection to the data source(s), allocates and configures compute resources to execute the business logic, causes the business logic to be executed, and provides a result in a dataframe. The system may provide the result in the form of a result identifier that may be used to obtain the result (e.g., to display the result in a dataframe). As an example, the business logic is a snippet of code corresponding to the query to be executed against the applicable dataset(s) (e.g., the business logic is the expression to be used to manipulate data in the dataset(s)). For example, the business logic is not a complete application—the business logic would be unexecutable in another context/environment.

Various embodiments enable a client system to execute a query based on providing an expression of code. For example, a subset of code that is not a full application or microservice. An expression of code is a small code like expression of data to be analyzed and does not include the full application or instantiation of an entire process. For example, the expression of code can be performed on a language based solely on using dataframes.

In some embodiments, the business logic may be input using one or more programming languages, such as Scala, Java, Python, and R. The system is configured to receive the business logic (e.g., input by a user in one or more programming languages), and to detect the programming language(s) according to which the business logic is input, and execute the business logic and return the result in a dataframe. For example, the system is configured to transform (e.g., translate) business logic from various programming languages into a particular logic/language, which is used to evaluate the business logic.

In some embodiments, the system configures a user interface via which a user inputs one or more hints. In response to receiving the one or more hints via the user interface, the system determines the applicable data source(s) based on a predefined ruleset or set of heuristics. For example, the system recursively determines the data source(s) that the user intends to query based at least in part on the one or more hints. Examples of hints include a date range, a data center, and an indication of an environment in which the business logic is to be executed (e.g., an indication of whether the data source to be queried is in a production environment, a test environment, a development environment, etc.). Various other types of hints may be implemented. In some embodiments, the system determines the data source(s) based on the one or more rule sets or hints in combination with one or more heuristics. Examples of the rule sets or heuristics used to determine the data source(s) include naming conventions, logical conventions, partitioning, etc.

In some embodiments, in response to determining the one or more data source(s) (e.g., datasets against which a query is to be executed), the system determines a source dataframe. For example, the system determines a configuration for a source dataframe. The system provides a source dataframe object to the user (e.g., via a user interface), and the business logic generated/input by the user is input to the source dataframe object. In response to the inputting of the business logic (e.g., the client system providing the source dataframe object to the system), the system allocates and configures compute resources (e.g., a cluster) to execute the business logic associated with the source dataframe. The system causes the business logic to be executed and generates a result. In response to the business logic being executed, the system provides to the client system information pertaining to the result, such as a result identifier or a dataframe comprising the results.

In some embodiments, the system enforces one or more security policies with respect to execution of the business logic (e.g., received via the source dataframe). Enforcement of the one or more security policies may include a transformation of the data responsive to the query. For example, the system executes the query based at least in part on the profile of the user associated with the client system. The system may impersonate the user from which the business logic is received (e.g., the user associated with the client system) and query a data source based at least in part on the impersonation (e.g., using the user identifier and/or other credentials associated with the user). The system may enforce the one or more security policies by implementing enforcement at the data source. For example, access to certain data is denied/permitted at the database level. For example, the data source determines permissions for the user associated with the query and returns results that are responsive to the query and for which the user has requisite permissions. As an example, the data source performs data masking based on the profile of the user (e.g., the user identifier and/or other credentials) to ensure that the system provides to the client only information for which the user has permission. The system may also enforce a security policy by applying the policy (e.g., at the data source level or the cluster level) on the resulting data before providing the resulting data to the client system. For example, the system masks (e.g., filters out or otherwise restricts access to) certain information associated with a security policy. Examples of information associated with security policies (e.g., for which the security policies restrict access) include personal identifying information (PII), Health Insurance Portability and Accountability Act (HIPPA) information, financial information, copyright protected material, General Data Protection Regulation (GDPR) data, etc. Such information may be identified or labeled, such as by metadata, or the system may use a classification model for predicting a classification of information and enforcement may be applied with respect to the predicted classification. Various other types of information may be masked in accordance with a predefined security policy. The result data (e.g., the results provided to the client system via a dataframe or otherwise accessible by a result identifier provided to the client system) is provided to the client system after enforcement of the one or more security policies.

In some embodiments, the system implements one or more security policies using a layered security model, where the system connects to other data systems and respects the security mechanisms that the other systems have in place. However, in addition, the system has its own independent security model. This independent security model allows users to create additional security requirements for derivatives of the data or the dataframe object, particularly when combining data from multiple discrete systems. This gives users the flexibility to have their own security needs layered on top of the underlying data sources security mechanisms.

In some embodiments, the system includes a simple public/private toggle as part of the independent security model to control access to certain user-owned dataframe resources. The public/private toggle is a way for users to control visibility of their dataframe resources to other users.

In some embodiments, the system includes a meta driven model to enable something similar to role based access on top of underlying security models from other systems. For example, the system includes a set of rules (e.g., based on roles and/or resources) to control access to certain resources, assigns roles and permissions to certain users, and checks whether users have access to certain resources based on their assigned roles and permissions.

In some embodiments, enforcement of the one or more security policies includes analyzing the business logic and restricting execution of at least part of the business logic deemed to be malicious. The system may use one or more heuristics or query a model for detecting malicious code (e.g., a classification model that classifies the code as malicious or benign, etc.). As an example, in response to determining that the business logic or a portion of the business logic includes malicious code, the system determines not to execute the business logic or a portion of the business logic. In some embodiments, the system determines the business logic input to the source dataframe is malicious. For example, the system performs a classification of maliciousness with respect to the business logic.

In some embodiments, the system determines resources to be implemented to execute received business logic, allocates a workload for executing the business logic to such resources, and causes the business logic to be executed. In response to receiving the business logic, the system determines the compute resources to be used to execute the business logic. The system may determine the configuration of the compute resources and/or a number of compute resources to be implemented. As an example, system determines the configuration or number of compute resources based at least in part on one or more of a type of data (e.g., the type of data to be processed/queried), a volume of data (e.g., a size of data in the desired date range or otherwise identified via the hint(s)), and a location of data (e.g., data center(s) in which the data is stored). The system may seek to maintain data locality by using compute resource(s) at the data center in which the data to be processed is stored.

In some embodiments, in response to determining the compute resources to be implemented in connection with executing the business logic, the system manages the allocation of the corresponding workload. For example, the system may have a set of reserved compute resources that are pooled for processing a given organization's workload, such as compute resources provided by a cloud host (e.g., Amazon Web Services, Microsoft Azure, etc.) for which the organization has contracted with the cloud host to be available for use on demand. As another example, the system may obtain compute resources from a spot market in which compute resources on a cloud host are sold at spot prices, which vary over time. Compute resources on the spot market do not have a guaranteed availability, and use of a spot market compute resource may be ceased during execution of the business logic. However, spot market resources can be torn down/released at any time, thereby ensuring that costs are not incurred for a resource not being used. The system determines a combination of reserved compute resources and spot market resources to be used in connection with executing the business logic, and the workload is allocated accordingly. The type of environment in which compute resources are to be allocated generally has different compute resource needs. In production environments, compute resources are not needed at all times—the system only needs the compute resources when a routine (e.g., business logic) is to be executed. Conversely, in development environments, the development cycle generally requires fast iteration between writing code and obtaining results, and thus development environments have different computational and speed requirements as compared to production environments. The system may determine the compute resources based at least in part on the type of environment in which the business logic is to be executed.

The system may implement one or more strategies (e.g., one or more compute resource policies) to determine the combination of the reserved compute resources and the spot market resources. For example, a first strategy may be to first use any available reserved resources, and to use the spot market to obtain additional compute resources for compute resource needs in excess of the capacity available from the reserved compute resources. As another example, a second strategy may be to allocate resources between reserved resources and spot market resources based on a minimization of costs to execute the business logic. As another example, a third strategy may be to enforce data locality such that compute resources are used at the data center where the corresponding data is stored. As another example, a fourth strategy may be to minimize the runtime (or ensure a runtime is within a predefined threshold of time) for executing the business logic.

Because spot market compute resources do not have a guaranteed availability, the system configures and implements a mechanism to suspend processing and save a status of the part of the workloads being performed by the compute resources in order to limit any loss in data or progress if a spot market computer resource becomes unavailable during processing of the workload (e.g., if the cloud host reallocates the spot market compute resource to another organization or workload). Further, the system configures the compute resources to resume the processing of the workload when the compute resources become available again or a new compute resource becomes available (e.g., a reserved compute resource completes the workload it was processing).

Various embodiments improve the simplicity of performing data analysis. The system makes the development of resources less complex for executing queries, such as by enabling developers to focus on the business logic to be executed without worrying about the infrastructure and management of execution of the business logic. Various embodiments may reduce organizational costs because the organization does not need to develop applications or microservices to implement the queries. Further, users do not need to be as sophisticated with respect to configuring and managing the infrastructure used to execute queries.

FIG. 1 is a block a diagram of a system for providing a dataframe as a service according to various embodiments of the present application. In some embodiments, system 100 implements process 1400 of FIG. 14, process 1600 of FIG. 16, process 1700 of FIG. 17, process 1800 of FIG. 18, process 1900 of FIG. 19, process 2000 of FIG. 20, process 2100 of FIG. 21, process 2200 of FIG. 22, and/or process 2300 of FIG. 23.

In the example illustrated in FIG. 1, system 100 includes DataFrame service 110, client system 120, and/or administrator system 130. System 100 may additionally include one or more data stores, such as data store 140, data store 150, and/or data store 160, and network 170 over which one or more of DataFrame service 110, client system 120, administrator system 130, and data stores 140-160 are connected. In some embodiments, DataFrame service 110 is implemented by a plurality of servers. In various embodiments, network 170 includes one or more of a wired network, and/or a wireless network such as a cellular network, a wireless local area network (WLAN), or any other appropriate network. System 100 may include various other systems or terminals.

In some embodiments, DataFrame service 110 comprises data layer 112, control layer 114, and/or business application layer 116. Data layer 112, control layer 114, and/or business application layer 116 respectively implemented by one or more servers. In some embodiments, data layer 112 comprises one or more clusters of compute resources.

In various embodiments, DataFrame service 110 processes workloads, such as at scale for big data evaluations. DataFrame service 110 is configured to receive one or more hints from another system, such as client system 120, and business logic to be executed. In response to receiving the one or more hints, DataFrame service 110 (e.g., control layer 114) determines one or more data sources storing data for which the other system is seeking to evaluate. In response to determining the data source(s), DataFrame service 110 obtains business logic to be executed (e.g., in connection with evaluating/analyzing the data). DataFrame service 110 is further configured to execute the business logic and provide the other system with a result (e.g., a pointer to a result, such as a result identifier, that the other system may use to obtain the result). In connection with executing the business logic, DataFrame service 110 configures the requisite infrastructure to be used during the execution, including configuring and establishing the connections between the compute resource(s) (e.g., cluster(s) of compute resource(s)) and the applicable data store(s), pooling compute resource(s) (e.g., according to a compute resource allocation strategy), configuring the compute resource(s), and causing the compute resource(s) to execute the business logic.

In some embodiments, the one or more hints identify one or more parameters for source data. Examples of hints include a date range, a data center, an indication of an environment in which the business logic is to be executed (e.g., an indication of whether the data source to be queried is in a production environment, a test environment, a development environment, etc.). Various other types of hints may be implemented. In some embodiments, DataFrame service 110 (e.g., control layer 114) determines the data source(s) based on the one or more hints in combination with one or more heuristics. Examples of the rule sets or heuristics used to determine the data source(s) include naming conventions, logical conventions, partitioning, etc. For example, DataFrame service 110 (e.g., business application layer 116) is configured to provide a user interface via which a user associated with client system 120 inputs the one or more hints. In response to receiving the one or more hints, DataFrame service 110 determines, based at least in part on the one or more hints, the data source(s) comprising dataset(s) to be analyzed.

In response to determining the data source(s) comprising the dataset(s) to be analyzed, DataFrame service 110 obtains the business logic to be executed for evaluating the dataset(s). For example, DataFrame service 110 (e.g., business application layer 116) is configured to provide a user interface via which a user associated with client system 120 inputs the business logic. DataFrame service 110 supports one or more programming languages, and in response to receiving the business logic, DataFrame service 110 transforms (e.g., translates) the business logic to a predefined logic (e.g., a language or set of commands) in order to execute the business logic. For example, the business logic may be input in one or more of Scala, Java, Python, and R.

In some embodiments, DataFrame service 110 obtains the business logic based at least in part on determining a data source (e.g., based on the one or more hints) and generating a source dataframe or a set of configurations of a source dataframe that are used to generate the dataframe during execution of the business logic. DataFrame service 110 (e.g., business application layer 116) configures the user interface with the source dataframe or a source dataframe object in which client system 120 inputs the business logic. In response to receiving the business logic via the user interface, DataFrame service 110 executes the business logic. In some embodiments, before executing the business logic, DataFrame service 110 enforces one or more security policies, such as performing a determination of whether the business logic comprises malicious code (e.g., performing a maliciousness classification with respect to the business logic).

In some embodiments, the system implements one or more security policies using a layered security model, where the system connects to other data systems and respects the security mechanisms that the other systems have in place. However, in addition, the system has its own independent security model. This independent security model allows users to create additional security requirements for derivatives of the data or the dataframe object, particularly when combining data from multiple discrete systems. This gives users the flexibility to have their own security needs layered on top of the underlying data sources security mechanisms.

In some embodiments, the system includes a simple public/private toggle as part of the independent security model to control access to certain user-owned dataframe resources. The public/private toggle is a way for users to control visibility of their dataframe resources to other users.

In some embodiments, the system includes a meta driven model to enable something similar to role based access on top of underlying security models from other systems. For example, the system includes a set of rules (e.g., based on roles and/or resources) to control access to certain resources, assigns roles and permissions to certain users, and checks whether users have access to certain resources based on their assigned roles and permissions.

In connection with executing the business logic, DataFrame service 110 determines a set of compute resources to be implemented to execute the business logic, allocates across the set of compute resources a workload for executing the business logic, configures the set of compute resources (e.g., instantiate a cluster of compute resources and establish connections between the set of compute resources and the applicable data source(s)), and causes the set of compute resources to execute the business logic. As an example, DataFrame service 110 uses data layer 112 to configure the set of compute resources and execute the business logic.

In response to executing the business logic, DataFrame service 110 obtains a result (e.g., data responsive to the evaluation of the query). Dataframe service 110 provides the result to client system 120. For example, DataFrame service 110 uses business application layer 116 to configure a user interface to display the results (e.g., provide a dataframe to client system 120). As another example, DataFrame service 110 obtains a result identifier or other pointer associated with the results and provides the result identifier or other pointer to client system 120 for the user to obtain the results.

DataFrame service 110 (e.g., control layer 114) implements one or more strategies (e.g., one or more compute resource policies) to determine/select compute resources to be implemented to execute the business logic. For example, DataFrame service 110 determines a set of reserved compute resources and/or a set of spot market compute resources across which the workload is to be allocated.

Data layer 112 manages a cluster of compute resources to execute the business logic. For example, data layer 112 establishes the connections between the set of compute resources and the data source(s) and allocates the workload for the business logic across the set of compute resources. In some embodiments, data layer 112 monitors execution of the business logic to detect performance of a compute resource or to determine whether a compute resource is to reallocated away from execution of the business logic. For example, data layer 112 may determine that DataFrame service 110 has received an indication that a spot market compute resources are being deallocated to system 100. In response to determining that a compute resource is to be re-allocated away from execution of the business logic, data layer 112 configures such compute resource(s) to suspend performance the part of the workload allocated to such compute resource(s) and to save the requisite information for data layer 112 to resume execution of such part of the workload using another compute resource or upon availability of the compute resource being re-allocated away from execution of the business logic. Data layer 112 services queries (e.g., processes workloads) received in connection with execution of the business logic such as by an application running on business application layer 116.

According to various embodiments, business application layer 116 provides an interface via which a user (e.g., using client system 120) may interact with various applications such as a development application for developing a service, application, and/or code, an application to access raw data (e.g., data stored in data stores 140-160), an application to analyze data (e.g., log data), etc. Various other applications can be provided by business application layer 116. For example, a user queries data layer 112 by sending a query/request to business application layer 116, which interfaces with data layer 112 and/or data store 140, data store 150, and/or data store 160 to obtain information responsive to the query (e.g., business application layer 116 formats the query according to the applicable syntax and sends the formatted query to data layer 112, such as via control layer 114). As another example, an administrator uses an interface provided/configured by business application layer 116 to configure (e.g., define) one or more security policies including access permissions to information stored on data store 140, data store 150, and/or data store 160, permission to access performance profiles, etc.

Administrator system 130 comprises an administrator system for use by an administrator. For example, administrator system 130 comprises a system for communication, data access, computation, etc. An administrator uses administrator system 130 to maintain and/or configure DataFrame service 110 and/or one or more of data stores (e.g., data store 140, data store 150, and/or data store 160). For example, an administrator uses administrator system 130 to start and/or stop services on DataFrame service 110 and/or one or more of data store 140, data store 150, and data store 160, to reboot one or more of data store 140, data store 150, and data store 160, to install software on DataFrame service 110 and/or one or more of data store 140, data store 150, and data store 160, to add, modify, and/or remove data on one or more of data store 140, data store 150, and data store 160, etc. Administrator system 130 communicates with DataFrame service 110 and/or one or more of data store 140, data store 150, and data store 160 via a web-interface. For example, administrator system 130 communicates with DataFrame service 110 and/or one or more of data store 140, data store 150, and data store 160 via a web-browser installed on administrator system 130. As an example, administrator system 130 communicates with DataFrame service 110 and/or one or more of data store 140, data store 150, and data store 160 via an application running on administrator system 130.

In various embodiments, an administrator (or other user associated with a tenant or entity with which the tenant is associated such as a customer) uses administrator system 130 to configure a service provided to a tenant. As an example, the administrator uses administrator system 130 to communicate with DataFrame service 110 to configure the service provided to the tenant. For example, administrator system 130 may communicates with DataFrame service 110 via business application layer 116. In some embodiments, business application layer 116 serves as a gateway via which the administrator may interface to manage, configure, etc. data layer 112, control layer 114, and/or business application layer 116. Administrator system 130 may configure one or more policies for DataFrame service 110, such as one or more security policies and/or one or more compute resource policies (e.g., a policy for determining compute resources, an allocation of compute resources, or a failover strategy when a compute resource fails or is otherwise re-allocated away from execution of the business logic).

Data store 140, data store 150, and/or data store 160 store one or more datasets. In various embodiments, the one or more datasets comprise human resources data, financial data, organizational planning data, or any other appropriate data. In some embodiments, data store 140, data store 150, and/or data store 160 store one or more datasets for a plurality of tenants or hosts. For example, data store 140, data store 150, and/or data store 160 hosts at least part of a software as a service (e.g., a database storing data for the service) for a plurality of tenants such as customers for a provider of the software as a service). In various embodiments, a tenant comprises an organization such as a company, a government entity, a sub-organization of an organization (e.g., a department), or any other appropriate organization. For example, data store 140, data store 150, and/or data store 160 comprise one or more database systems for storing data in a table-based data structure, an object-based data structure, etc. In various embodiments, data store 140, data store 150, and/or data store 160 comprise one or more of: a business database system, a human resources database system, a financial database system, a university database system, a medical database system, a manufacturing database system, or any other appropriate system. In some embodiments, data store 140, data store 150, and/or data store 160 comprise one or more object-oriented database systems.

According to various embodiments, a user uses system 100 (e.g., a client or terminal, such as client system 120, that connects to system 100 via network 170) to define business logic and/or to execute such business logic with respect to data (e.g., one or more datasets) stored on data store 140, data store 150, and/or data store 160. For example, a user inputs to client system 120 one or more hints pertaining to information on which the user seeks to execute business logic (e.g., run a query against a dataset). The one or more hints may pertain to parameters of a data store or environment for which the business logic is to be executed. In response to receiving the one or more hints, DataFrame service 110 implements recursive logic to determine the one or more data sources storing the data that DataFrame service 110 infers the user seeks to evaluate based on the one or more hints. In response to determining the data source(s), DataFrame service 110 configures a source dataframe, and the user inputs to client system 120 business logic (e.g., the user inputs the business logic to a source dataframe object provided by a user interface). In response to receiving the business logic, DataFrame service 110 uses data layer 112 (e.g., a cluster of compute resources) to execute the business logic (e.g., with respect to data stored by data store 140, data store 150, and/or data store 160) and provides a result to the user (e.g., via a user interface provided on client system 120). In some embodiments, the result comprises information or a set of information that is responsive to the execution of the business logic. DataFrame service 110 may enforce one or more security policies with respect to the result, including restricting access to certain information to which the user associated with client system 120 does not have permissions or otherwise masking certain information. In some embodiments, the result comprises a report including information that is responsive to the execution of the business logic or selectable elements (e.g., links such as hyperlinks) that point to information that is responsive to the execution of the business logic. The result may be provided in a dataframe.

In some embodiments, data layer 112, control layer 114, and/or business application layer 116 are implemented on a single server or a plurality of servers. For example, data layer 112 and business application layer 116 are different modules running on a same server or set of servers.

Figure 2:
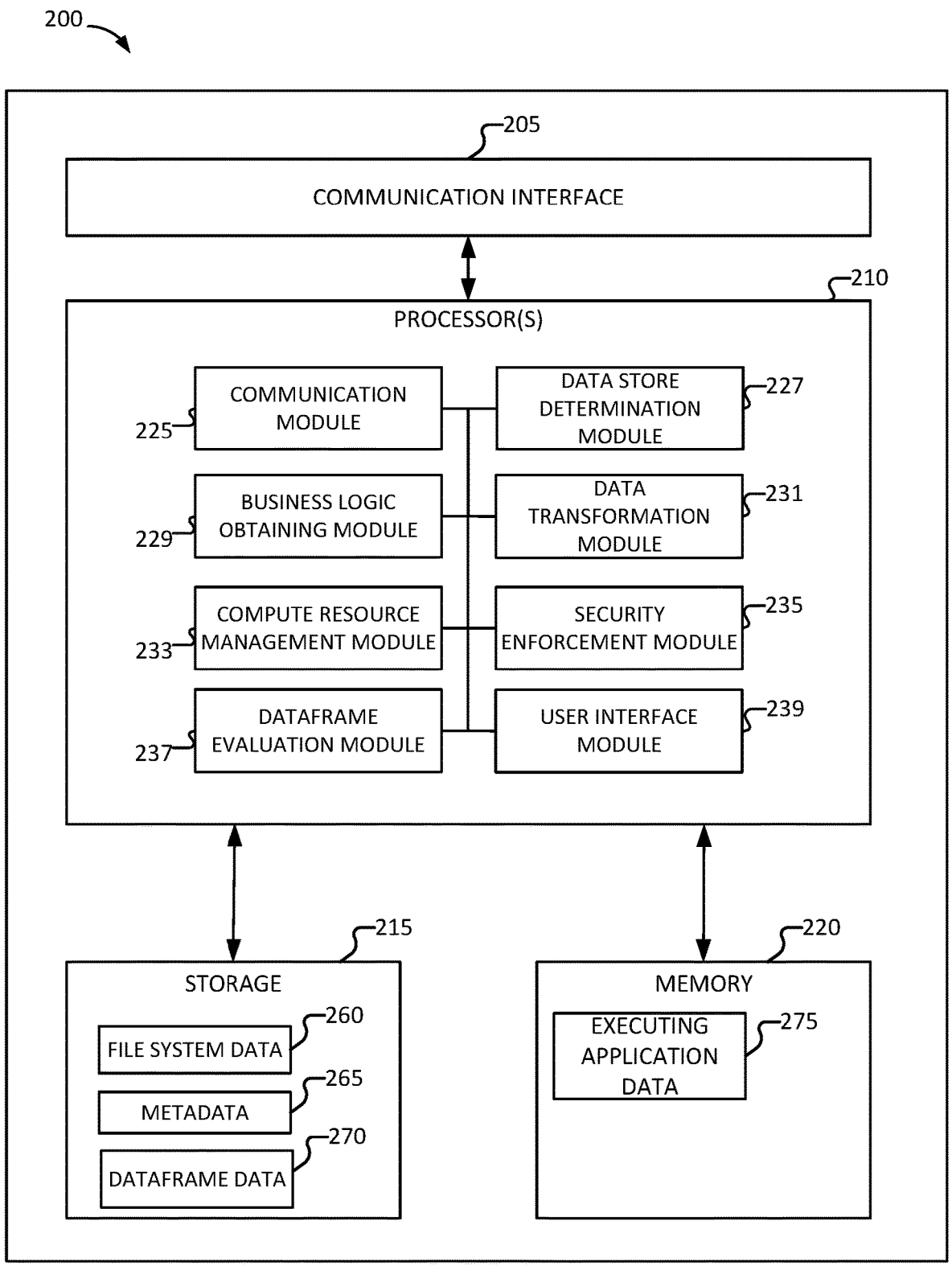
FIG. 2 is a block diagram of a system for providing a dataframe as a service according to various embodiments of the present application.

FIG. 2 is a block diagram of a system for providing a dataframe as a service according to various embodiments of the present application. In some embodiments, system 200 comprises, or corresponds to, DataFrame service 110, such as one or more of data layer 112, control layer 114, and/or business application layer 116. System 200 may implement at least part of system 100 of FIG. 1, such as DataFrame service 110. System 200 may implement at least part of process 1400 of FIG. 14, process 1600 of FIG. 16, process 1700 of FIG. 17, process 1800 of FIG. 18, process 1900 of FIG. 19, process 2000 of FIG. 20, process 2100 of FIG. 21, process 2200 of FIG. 22, and/or process 2300 of FIG. 23. According to various embodiments, system 200 corresponds to, or comprises, a system for providing a dataframe as a service, including receiving business logic, configuring infrastructure to execute the business logic, processing workloads, determining allocations of the workload across a cluster of compute resources, such as a partitioning of tasks at a particular stage in processing the workloads.

In the example shown, system 200 implements one or more modules in connection with providing a dataframe as a service, such as to enable users to evaluate data on one or more data sources without requiring the users to configure the infrastructure to execute the evaluation. System 200 comprises communication interface 205, one or more processors 210, storage 215, and/or memory 220. One or more processors 210 comprises one or more of communication module 225, data store determination module 227, business logic obtaining module 229, data transformation module 231, compute resource management module 233, security enforcement module 235, dataframe evaluation module 237, and/or user interface module 239.

In some embodiments, system 200 comprises communication module 225. System 200 uses communication module 225 to communicate with various client terminals or user systems such as a user system (e.g., client system 120) or an administrator system (e.g., administrator system 130), or other layers of system 100 such as a data layer 112, business application layer 116, data store 140, data store 150, data store 160, etc. For example, communication module 225 provides to communication interface 205 information that is to be communicated. As another example, communication interface 205 provides to communication module 225 information received by system 200. Communication module 225 is configured to receive one or more queries or requests to execute business logic (e.g., requests for processing workloads, servicing queries, etc.) such as from various client terminals or user systems (e.g., from the terminals or systems via a business application layer). The one or more queries or requests to execute tasks is with respect to information stored in one or more datasets (e.g., data stored in data store 140-160). Communication module 225 is configured to provide to various client terminals or user systems information such as information that is responsive to one or more queries or tasks requested to be executed. In some embodiments, communication module 225 provides the information to the various client terminals or user systems information in the form of one or more dataframes, reports (e.g., according to a predefined format or to a requested format), and/or via one or more user interfaces (e.g., an interface that the user system is caused to display).

In some embodiments, communication module 225 is configured to receive information pertaining to a workload or data to be analyzed. Examples of information received by communication module include one or more hints (e.g., information pertaining to parameters of data to be analyzed), business logic, etc. Communication module 225 may also be configured to receive information pertaining to capacity/availability of compute resources. For example, a communication module 225 interfaces with a cloud service provider (e.g., a host such as Microsoft Azure, Amazon Web Services, etc.) to obtain information pertaining to availability of compute resources, pricing for obtaining spot market compute resources, etc. In some embodiments, communication module 225 is configured to communicate results of the workload processing. For example, communication module 225 sends the results to a user such as via a user interface of a client terminal. The results may be sent as a result dataframe, or an identifier for the results which the client terminal uses to retrieve the results.

In some embodiments, system 200 comprises data store determination module 227. System 200 uses data store determination module 227 to infer one or more data sources storing data that a user seeks to analyze (e.g., data against which business logic is to be evaluated). System uses user interface module 239 to generate a user interface via which one or more hints are input (e.g., by a client system). The one or more hints identify one or more parameters for source data (e.g., the data against which business logic is to be evaluated). Examples of the one or more hints include a date range, a data center, an indication of an environment in which the business logic is to be executed (e.g., an indication of whether the data source to be queried is in a production environment, a test environment, a development environment, etc.). Various other hints may be implemented. In some embodiments, the user interface via which the one or more hints are input forces a user to provide sufficient heuristics that allow data store determination module 227 to filter out relevant data for determining the data source storing the source dataset. The user interface may require input of certain values for particular hints, such as a date range, an environment type, a data source name, a range of rows in a dataset, etc. The user interface may be configured to not require versioning information to be input by the user, and data store determination module 227 is configured to identify the content corresponding to the source dataset. For example, data store determination module 227 is configured to determining the applicable versioning (e.g., based on the one or more hints, such as date range).

In some embodiments, system 200 stores a registry of datasets, such as logical tables (e.g., dataframe objects). In response to receiving the one or more hints, the system recursively attempts to match the one or more hints with a source dataset in the registry (e.g., a dataset for which the one or more hints match). For example, the user may input a string corresponding to, or that is similar to, a dataset, and in response to receiving the input string, data store determination module 227 determines the dataset matching the input string (e.g., and any other parameters that are input as hints, such as date range, or data center). Data store determination module 227 may implement one or more mechanisms to deal with naming conflicts on datasets. For example, in response to determining that the one or more hints matches a plurality of datasets, data store determination module 227 prompts the user (e.g., via a user interface provided by user interface module 239) to select the source dataset to be associated with the business logic. Although a plurality of datasets may have conflicting names, each dataset is associated with a universally unique identifier (UUID). Accordingly, data store determination module 227 determines the UUID associated with the source dataset and provides the UUID for the source dataset to the system or module that configures a source dataframe.

In response to determining an inferred source dataset corresponding the one or more hints, system 200 configures a source dataframe via which business logic is to be input by the client system.

In some embodiments, system 200 comprises business logic obtaining module 229. System 200 uses business logic obtaining module 229 to obtain business logic from the client system, parse the business logic, and cause the business logic to be executed. The business logic may correspond to an expression of code corresponding to an evaluation to be performed against the source dataset. Business logic obtaining module 229 obtains the business logic via a source dataframe object and provides the source dataframe object to the client system via user interface module 239. The source dataframe object may point to the source dataset.

In some embodiments, business logic obtaining module 229 configures the source dataframe (e.g., determines parameters/configurations for the source dataframe and generates a corresponding source dataframe object). Business logic obtaining module 229 configures the source dataframe based at least in part on the source dataset and/or one or more hints. In response to configuring the source dataframe, business logic obtaining module 229 provides to the client system a corresponding source dataframe object. The client system (e.g., the user) may input business logic to the user interface (e.g., the source dataframe object). In response to the input of the business logic to the source dataframe object, business logic obtaining module 229 parses the business logic. As an example, parsing the business logic includes querying security enforcement module 235 to determine whether the business logic comprises malicious code. As another example, parsing the business logic includes detecting a programming language in which the business logic is input. In response to parsing the business logic, business logic obtaining module 229 may transform the business logic based at least in part on the programming language(s) in which the business logic is input. For example, business logic obtaining module 229 determines a transformation to be performed to transform (e.g., translate) the business logic into a particular logic/language.

In some embodiments, system 200 comprises data transformation module 231. System 200 uses data transformation module 231 in connection with executing the business logic. For example, data transformation module 231 performs one or more transforms with respect to the source dataset, the one or more transforms being based at least in part on the business logic. For example, the one or more transforms are used to evaluate the source dataset according to the business logic.

In some embodiments, system 200 comprises compute resource management module 233. System 200 uses compute resource management module 233 to abstract away from the user/client system the management of the architecture used to process the business logic. For example, system 200 uses compute resource management module 233 to determine a set of compute resources to be implemented, including a type(s) of compute resources, a number of compute resources, a source of the compute resources (e.g., reserved compute resources, spot market compute resources, etc.).

In some embodiments, compute resource management module 233 determines the set of compute resources based at least in part on the one or more hints and/or the business logic. For example, compute resource management module 233 determines the set of compute resources based at least in part on a type of data to be evaluated, a size of data to be evaluated, etc. As another example, compute resource management module 233 determines the set of compute resources based at least in part on the query/evaluation to be performed against the source dataset.

Compute resource management module 233 may further determine the set of resources based at least in part on the one or more compute resource policies or strategies for resource allocation.

In some embodiments, the set of compute resources comprises one or more of reserved compute resources and spot market compute resources. As an example, the set of compute resources may comprise a first subset corresponding to a reserved compute resource(s) and a second subset corresponding to a spot market compute resource(s). Compute resource management module 233 may implement one or more strategies (e.g., one or more compute resource policies) to determine the combination of the reserved compute resources and the spot market resources. For example, a first strategy may be to first use any available reserved resources, and to use the spot market to obtain additional compute resources for compute resource needs in excess of the capacity for the available reserved compute resources. As another example, a second strategy may be to allocate resources between reserved resources and spot market resources based on a minimization of costs to execute the business logic. As another example, a third strategy may be to enforce data locality such that compute resources at the data center were the corresponding data is stored are used. As another example, a fourth strategy may be to minimize the runtime (or ensure a runtime within a predefined threshold of time) for executing the business logic.

In some embodiments, system 200 uses compute resource management module 233 to manage the compute resources during execution. For example, in the event that a compute resource is de-allocated away from execution of the current business logic, compute resource management module 233 is configured to suspend processing of a part of the workload by the compute resource that is to be deallocated. Compute resource management module 233 may be further configured to store a progress or current state of the processing of the part of the workload when the processing is suspended in response to an indication that the compute resource is to be deallocated. The de-allocation of the compute resource may correspond to a re-allocation of the compute resource to another workload, or the compute resource is no longer available, such as in the case that a cloud service/host restricts availability of a spot market compute resource that was being used to process at least part of the workload. Compute resource management module 233 may be configured to re-allocate the workload to another compute resource (e.g., another spot market resource, another reserved compute resource, or a compute resource that has completed its part of the workload corresponding to the business logic), and cause the other compute resource to resume the processing of the part of the workload that was suspended (e.g., because of the de-allocation).

In some embodiments, system 200 comprises security enforcement module 235. System uses security enforcement module 235 to enforce one or more security policies with respect to evaluating the business logic received via the source dataframe. In some embodiments, security enforcement module 235 ensures that the user (e.g., the client system) does not receive any information for which the user does not have requisite permissions.

In some embodiments, security enforcement module 235 analyzes the business logic and determines whether the business logic comprises malicious code. Security enforcement module 235 may determine whether the business logic comprises malicious code based at least in part on querying a classification model. The classification model may use predefined regex expressions in connection with determining whether business logic comprises malicious code. For example, security enforcement module 235 determines whether the any part of the business logic matches a predefined regex expression that is indicative of malicious code.

In some embodiments, security enforcement module 235 restricts the providing of certain information to the client system (e.g., by applying mandatory transformations on the data). For example, security enforcement module 235 transforms result data to mask certain information, such as financial data, personally identifiable information (PII), HIPPA information, trade secrets, etc. Security enforcement module 235 may manipulate the result data to mask certain field, certain values, etc. at runtime of evaluating the business logic.

In some embodiments, security enforcement module 235 restricts the providing the certain information to the client system by obtaining a token or other credential from the client system (e.g., in connection with inputting the business logic), or a single sign on or other mechanism for authenticating the user before accessing services provided by system 200. System 200 may enforce permissioning at the database level, such as at the source dataset. For example, system 200 determines the set of result data for which the user has requisite permissions (e.g., based on the token). As another example, system 200 impersonates the user in connection with querying the source dataset, and the corresponding database may enforce, based on permissions associated with the user, a permissioning with respect to information being queried or returned based on the query.

In some embodiments, system 200 comprises dataframe evaluation module 237. System 200 uses dataframe evaluation module 237 to evaluate the business logic and obtain result data. Dataframe evaluation module 237 obtains the query from the source dataframe object in which the business logic was input. In response to receiving a request for a result from the client system, dataframe evaluation module 237 configures transformations on the source dataset(s) for the query. Dataframe evaluation module 237 obtains a result dataframe corresponding to a result of executing the transformations on the source dataset. Dataframe evaluation module 237 provides the result to the client system via the user interface configured by user interface module 239. As an example, dataframe evaluation module 237 provides to the client system the result dataframe comprising the result data responsive to the query. As another example, dataframe evaluation module 237 provides to the client system a result identifier of the result via which the client system access the result.

In some embodiments, in response to receiving a request from the client system for the result corresponding to the result identifier, system 200 evaluates the transformation(s) corresponding to the query to obtain the result in the result dataframe.

In some embodiments, system 200 comprises user interface module 239. System 200 uses user interface module 239 in connection with configuring information (or the display thereof) to be provided to the user such as via client system 120 and/or administrator system 130 of system 100. In some embodiments, user interface module 239 configures a user interface to be displayed at a client terminal used by the user or administrator, such as an interface that is provided in a web browser at the client terminal. In some embodiments, user interface module 239 configures the information to be provided to the user such as configuring one or more reports of information that is responsive to a query or task executed with respect to the source dataset(s) (e.g., a query or task executed against data stored on data store 140, data store 150, and/or data store 160). In some embodiments, user interface module 239 configures a user interface with which a user or other system inputs the one or more hints and the business logic (e.g., a query).

According to various embodiments, storage 215 comprises one or more of file system data 260, metadata 265, and/or dataframe data 270. Storage 215 comprises a shared storage (e.g., a network storage system). Storage 215 may comprise database data and/or user activity data. In some embodiments, file system data 260 comprises a database such as one or more datasets (e.g., one or more datasets for one or more tenants, etc.). File system data 260 comprises data such as a dataset for historical information pertaining user activity, a human resources database, a financial database, etc. In some embodiments, metadata 265 comprises information pertaining to the data store(s) and/or data stored on the data store(s). As an example, metadata 265 stores an index of data stored on the data store(s), location information indicating a location at which data is stored on the data store(s), etc. As another example, metadata 265 comprises the registry for datasets and information by which a source dataset may be identified. In some embodiments, dataframe data 270 comprises information pertaining to dataframes processed (or to be processed) in connection with processing a workload, such as tasks source dataframes and/or result dataframes.

According to various embodiments, memory 220 comprises executing application data 275. Executing application data 275 comprises data obtained or used in connection with executing an application such as an application executing on a tenant. In embodiments, the application comprises one or more applications that perform one or more of receive and/or execute a query or task, generate a report and/or configure information that is responsive to an executed query or task, and/or to provide to a user information that is responsive to a query or task. Other applications comprise any other appropriate applications (e.g., an index maintenance application, a communications application, a chat application, a web browser application, a document preparation application, a report preparation application, a user interface application, a data analysis application, an anomaly detection application, a user authentication application, etc.).

Figure 3:
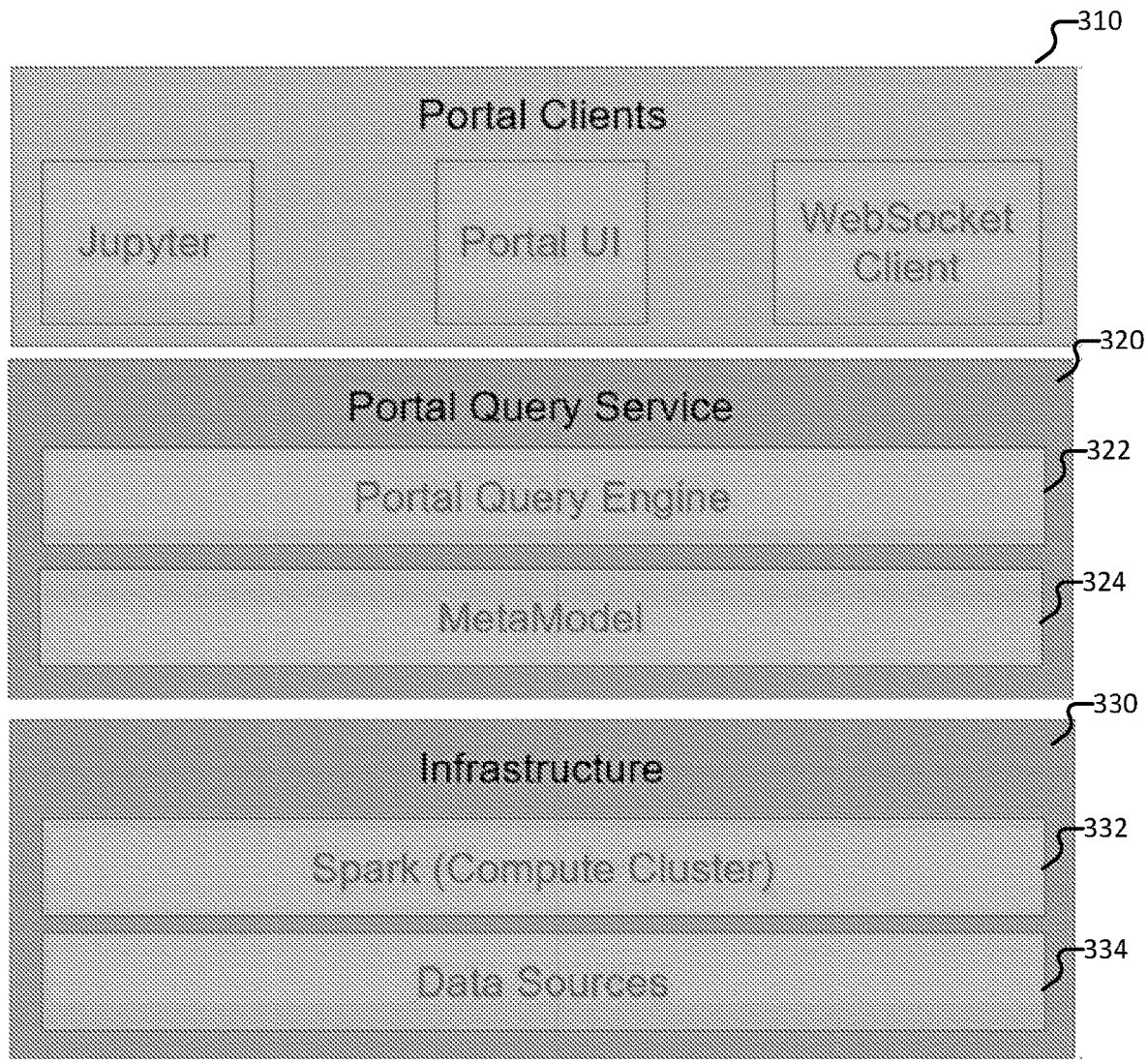
FIG. 3 is a block diagram of a system for providing a dataframe as a service according to various embodiments of the present application.

FIG. 3 is a block diagram of a system for providing a dataframe as a service according to various embodiments of the present application. In some embodiments, system 300 implements at least part of system 100 of FIG. 1 and/or system 200 of FIG. 2.

System 300 provides a dataframe as a service via which a user obtains results to a query in response to inputting one or more hints pertaining to parameters of source data, and business logic to be executed against the source data. In the example shown, system 300 comprises client layer (e.g., portal clients 310), query service layer (e.g., portal query service 320), and infrastructure layer (e.g., infrastructure 330).

In some embodiments, client layer (e.g., portal clients 310) comprises one or more clients (e.g., Jupyter, Portal UI, WebSocket Client) via which a client system interfaces with the dataframe service. For example, the client system provides to system via the client layer (e.g., portal clients 310) one or more hints that are to be used to locate source data (e.g., information pertaining to parameters of the data source to be queried). In response to providing the one or more hints and system 300 determining the source data, system 300 determines a configuration for a source dataframe and provides to the client system a source dataframe object. The client system inputs via the client layer (e.g., portal clients 310) business logic to the source dataframe object. The business logic may be input in one or more languages, such as Python, Pandas, Scala, SQL, etc. In response to inputting the business logic, the client system provides to the dataframe service the source dataframe. In response to inputting the business logic (e.g., providing the source dataframe to dataframe service for evaluation), the dataframe service obtains an identifier for the result. For example, the system determines a configuration of a result dataframe that is configured to comprise the results. In response to a receiving a request from the client system to access the results, the dataframe service (e.g., a query service layer such as portal query service 320) causes infrastructure layer (e.g., infrastructure 330) to evaluate the business logic and obtain the results.

In some embodiments, portal query service 320 comprises a query engine (e.g., portal query engine 322) and metamodel 324. Portal query service 320 uses portal query engine 322 to parse the one or more hints and infer a source dataset to be queried. In response to determining the source dataset, portal query engine 322 determines a configuration for a source dataframe and generates a corresponding source dataframe object that is provided to client system for input of business logic. In response to receiving a source dataframe comprising the business logic to be evaluated against the source data, portal query engine 322 determines one or more transformations to perform in connection with evaluating the business logic. Portal query service 320 uses metamodel 324 to apply mandatory transformations. Mandatory transformations may comprise transformations that are to be applied based on enforcement of one or more policies, such as a security policy. For example, the mandatory transformations may include masking certain information in accordance with the policy (e.g., masking PII, HIPPA information, financial information, etc.). The masking may be applied on a cell level or a row level of the dataframe. In connection with executing the business logic, portal query service 320 allocates the corresponding workload to infrastructure layer 330, which evaluates the query against the source dataset. Infrastructure layer 330 may comprise one or more clusters of compute resources (e.g., compute cluster 332) and one or more data sources 334.

FIG. 4 is a diagram of a user interface used in connection with providing a dataframe as a service according to various embodiments of the present application. In some embodiments, user interface 400 is implemented at least part by system 100 of FIG. 1 and/or system 200 of FIG. 2.

As illustrated in the example, user interface 400 comprises one or more fields via which the user defines a query to be evaluated against a dataset(s). For example, user interface 400 comprises a query name field 410, a date range field 420, a row limit field 430, a source dataframe object 440.

Query name field 410 is configured to receive a name or other identifier to be associated with the query.

Date range field 420 is configured to receive one or more parameters pertaining to dates for which source data is to be evaluated. For example, the user may input to date range field 420 a range of dates for data that is to be subject to evaluation. In some embodiments, the date range input to date range field 420 is used as a hint by which the dataframe service infers or identifies the source data (e.g., the source dataset or data source on which the source dataset is stored).

Row limit field 430 is configured to receive definition pertaining to a number of rows to be analyzed or provided as a result. For example, the user inputs a limit on number of rows to be returned as a result.

Source dataframe object 440 is configured to receive the business logic to be evaluated against the source data. The user inputs the business logic according to one or more programming languages. In some embodiments, the user inputs an identifier associated with the intended source data, such as a name of the source data.

User interface 400 may further comprise data source field 450. Data source field 450 is configured to list a set of available data sources, such as a set of data sources for an applicable tenant or a set of data sources to which the user logged into the user interface has access. Data source field 450 may comprise information pertaining to the set of available data sources, such as the name associated with the data source, and an indication of a type of the data source. In the example shown, the system has determined (e.g., based on the one or more hints) that the data source storing the source data corresponds to the data source 452 named "access". User interface 400 may be configured to provide an indication of the source data source, such as by including the check-mark adjacent to the data source name.

User interface further comprises advanced options 460, which is a selectable element, that causes the system to display advanced options for inputting one or more hints, or otherwise defining a query to be evaluated. As an example, in response to a user selecting advanced options 460, the system invokes user interface 500.

Figure 5:
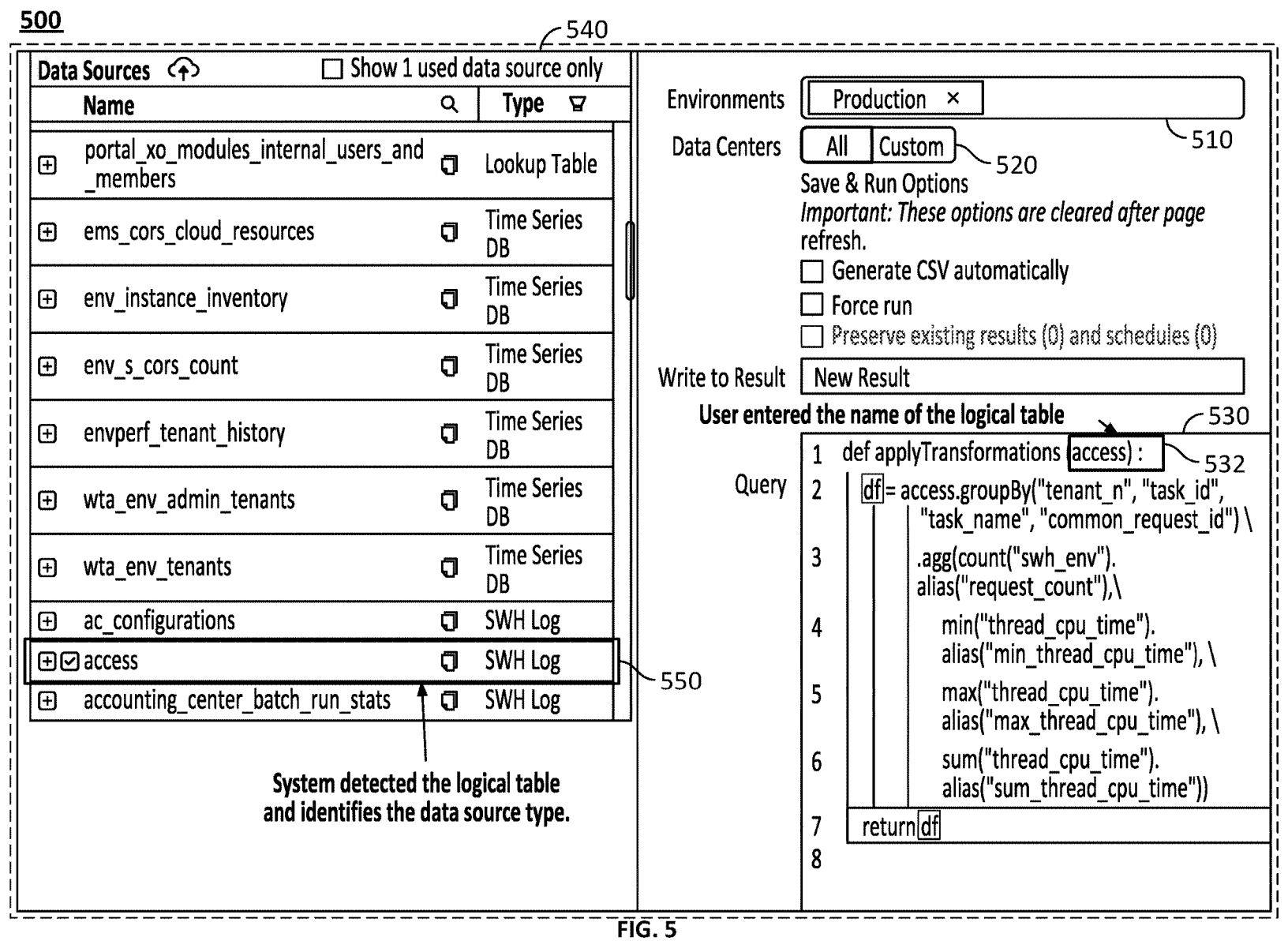

FIG. 5 is a diagram of a user interface used in connection with providing a dataframe as a service according to various embodiments of the present application. In some embodiments, user interface 500 is implemented at least part by system 100 of FIG. 1 and/or system 200 of FIG. 2. In some embodiments, user interface 500 is provided in response to the user selecting advanced options 460 on user interface 400.

As illustrated in the example, user interface 500 comprises one or more fields via which the user defines a query to be evaluated against a dataset(s). User interface 500 displays advanced options for defining the parameters of the query to be evaluated. In the example shown, user interface 500 comprises environment type field 510, data center field 520, source dataframe object 530, and data source field 540. User interface 500 may further various other parameters for evaluating the query, such as fields to indicate when the query will be executed, where results are to be stored, etc.

Environment type field 510 is configured to receive a selection or indication of one or more types of environment under which the query is to be executed. Examples of environment types include: product environment, development environment, test environment. Various other environment types may be implemented. The various environment types have different configurations and requirements, such as processing requirements. In some embodiments, the environment type input to environment type field 510 is used as a hint by which the dataframe service infers or identifies the source data (e.g., the source dataset or data source on which the source dataset is stored). In various embodiments, environmental type field 510 is configured to receive an indication of the source dataset, the source data, data source, or any other appropriate indication.

Data center field 520 is configured to receive one or more parameters pertaining data centers storing data to be evaluated. For example, the user may input to data center field 520 a selection of all data centers, a single particular data center, or a subset of all data centers. In some embodiments, the selected data center(s) input to data center field 520 is used as a hint by which the dataframe service infers or identifies the source data (e.g., the source dataset or data source on which the source dataset is stored).

Source dataframe object 530 is configured to receive the business logic to be evaluated against the source data. The user inputs the business logic according to one or more programming languages. In some embodiments, the user inputs an identifier associated with the intended source data, such as a name of the source data. An example of the input of the identifier associated with the intended source data includes the input of "access" as denoted by 532. The system uses such input as an additional hint in determining the source data. The user is not required to input a particular versioning of a desired source data. The system may determine the appropriate versioning of a particular dataset based on the one or more hints, such as date ranges.

User interface 500 may further comprise data source field 540. Data source field 540 is configured to list a set of available data sources, such as a set of data sources for an applicable tenant or a set of data sources to which the user logged into the user interface has access. Data source field 540 may comprise information pertaining to the set of available data sources, such as the name associated with the data source, and an indication of a type of the data source. In the example shown, as denoted by 550, the system has determined (e.g., based on the one or more hints) that the data source storing the source data corresponds to the data source named [access] of the type [SWH Log]. User interface 500 may be configured to provide an indication of the source data source, such as by including the check-mark adjacent to the data source name. In some embodiments, the data sources comprised in data source field 540 correspond to logical tables (e.g., dataframe objects) that are associated with a plurality of physical tables, such as tables having different versioning.

Figure 6:
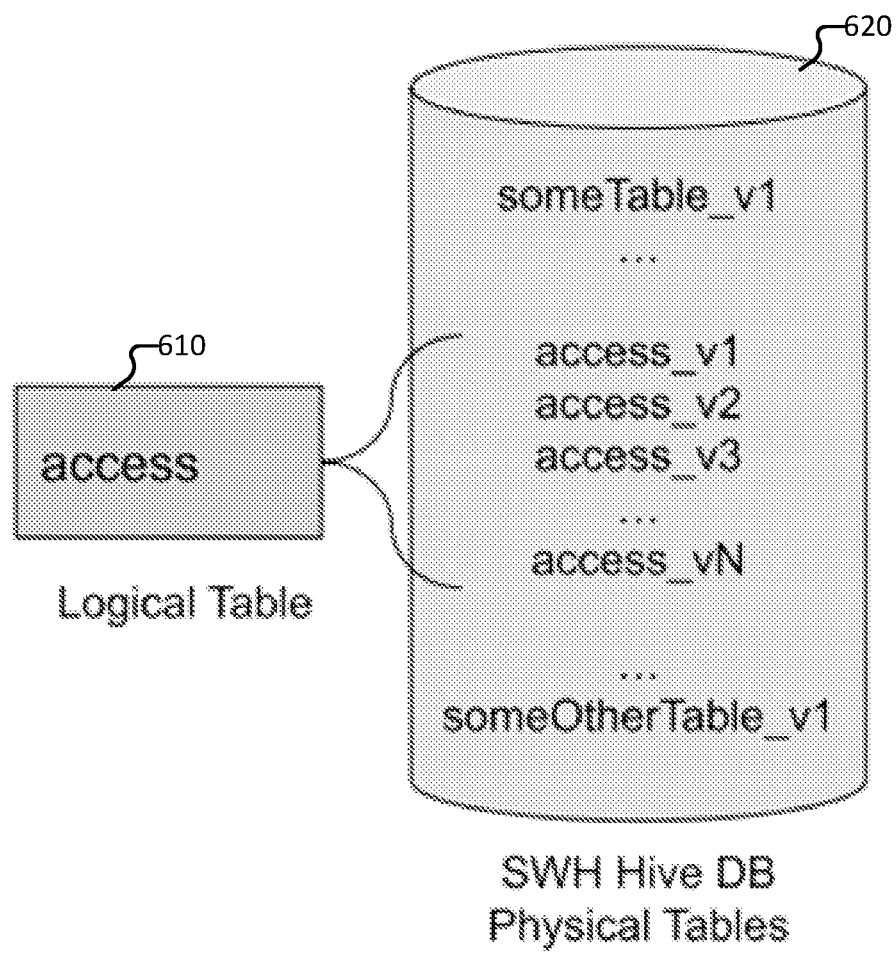
FIG. 6 is a diagram of a logical table according to various embodiments of the present application.

FIG. 6 is a diagram of a logical table according to various embodiments of the present application. The system for providing dataframe as a service can be connected to multiple different independent data systems. Examples of types of such data systems include MySQL™, Apache Hive™, Files, Rest application programming interface (API) endpoints, etc. A plurality of the independent data systems may have conflicting data source names. For example, a first system may have a data source that has the same name as a data source(s) on one or more other data systems.

In some embodiments, the system is configured to perform a scan of all data systems (e.g., all data systems associated with a tenant, etc.) and register all data sources into a data source registry. In connection with registering the data sources into the data source registry, each data source is assigned a UUID. The data sources may also be assigned a default name in connection with registration.

In the example shown, logical table 610 having the name [access] is mapped to one or more physical data locations. Logical table 610 may be the data source identified on user interface 400 or user interface 500. As illustrated, logical table is mapped to real data stored in data system 620. Although FIG. 6 illustrates data system 620 as an Apache Hive data system, data system 620 may be various types of data system.

The real data for logical [access] table resides in data system 620. However, the system does not comprise a database having the name [access]. Rather, as illustrated in FIG. 6, data system 620 stores several tables having iterations of the name [access], such as tables having the names [access_v1], [access_v2], [access_v3], [access_N]. Each of those several tables are independent from each other and may contain its own schema. From the perspective of data system 620, such tables are not the same. However, with respect to the dataframe as the service, these tables represent a same log that may have undergone schema changes at various points in time.

In related art systems, users generally are required to know which table version is to be used for a desired date range. In addition, if the query pertains to a large date range, the user may be required to develop a union of several tables across various schemas. In various embodiments, the system programmatically defines the conventions used in particular data systems. In the above example, the system defines the algorithm to scan tables with the following pattern: [any_text_value]_v[any_integer_value]. The [any_text_value] field has the semantic meaning of the log/table name. The [any_integer_value] is the version number of such log/table.

Because various tables associated with a logical table may have various different schemas, the system enforces a policy (e.g., performs a schema evolution process) under which the logical table is forced to contain the schema from a particular physical table. In some embodiments, the system forces the logical table to contain the schema from the newest physical table.

In various embodiments, the schema evolution process is implemented outside the particular data system storing the physical tables. Accordingly, the data source registry according to various embodiments incorporates transformations that related art schema evolution technologies do not. Various embodiments implement a combination of automatic transformation rules and manual transformation rules to perform the final schema evolution. In the current example in which data system 620 is an Apache Hive, the automatic transformation rules includes definition of conventions that the Hive sysadmins use when creating the physical tables to be stored in data system 620. In some embodiments, the data source registry supports more granular or nuanced versioning, such as column renames or table renames.

The system defines the automatic transformation rules based at least in part on comparing an older schema to the lates schema. For example, the system generates the automatic transformation rules that can be converted into Spark transformations and applied at runtime. It is generally common for data producers or developers to rename columns in order to give the field a more descriptive meaning. However, the semantics of the column are unchanged. In some embodiments, the automatic transformation rules comprise heuristic logic to detect and account for nuanced versioning such as column renames. As an example, the system comprises automatic transformation rules that determine that a rename event occurred if (i) a new table version is missing a column that was present in the previous version, (ii) a new column is detected, (iii) the data types are the same in both old and new columns, and (iv) the description text for columns match exactly. In response to determining that all of the heuristics are satisfied, the system deems that a column rename was performed and the system determines to make the applicable scheme change.

In various embodiments, manual transformation rules are used to override the automatic transformation rules enforced by the system. For example, manual transformation rules may be applied if (i) entire tables are renamed, (ii) new table versions were unintentionally published, (iii) the tables are moved to a new database, or (iv) any transformation that is to override the transformations determined from the automatic transformation ruleset.

In various embodiments, the transformations that the system determines are to be performed in connection with the query evaluation are not immediately performed. Rather, the system stores an indication of the requisite transformations, and applies the transformations upon the user requesting the result from the query evaluation. In some embodiments, the indication of the transformations is associated with the result dataframe that the system generates in response to receiving the source dataframe.

FIG. 7 is a diagram user interface used in connection with providing a dataframe as a service according to various embodiments of the present application. In the example shown, data (e.g., one or more hints) input to user interface 700 is used to determine the source data.

Various embodiments create an abstraction layer on top of the underlying data systems, such as data system 620 of FIG. 6. Because of this abstraction layer, the system is able to force the use of best practice, such as aligning a query to a particular partition. Such enforcement of the use of best practices improves query performance that is specifically tailored for the applicable data sources. Improvements to the query performance may include one or more of: less read of data, better network efficiency, less compute resources, and/or faster performance.

The selection of the logical table (e.g., the logical table named [access] in the examples above) is one factor or hint used by the system in connection with determining a configuration of a source dataframe. In some embodiments, the system enforces the input of one or more additional input parameters. The system may determine, based at least in part on the selected logical table,) the one or more additional input parameters to be required from the user. In some embodiments, in response to determining the one or more additional input parameters, the system configures the user interface and enforces input of such parameters.

In the example shown, after the user selects the logical table having the name [access], the system queries the data source registry to obtain/determine the required input parameters for the associated data source. The system then dynamically configures the user interface to create a form that will prompt a user to populate field(s) corresponding to the required input parameters.

In the example shown, the logical table named [access] is a data source of type SWH log. Rules in the data source registry require input parameters including a date range, an environment (e.g., an environment type), and a data center for any data source of type SWH log. For example, in response to determining that the [access] logical table is selected by a user, the system configures user interface to include date range field 710, environment type field 720, and data center field 730, to enforce input of the required parameters. The required parameters may correspond to one or more hints input by the user. In some embodiments, the system uses information comprised in date range field 710, environment type field 720, data center field 730, and data source field 740 (e.g., the logical table to use as the data source) to construct the source dataframe.

In response to receiving the one or more required parameters, the system generates a source dataframe, or determines a configuration for a source dataframe, according to which the source dataframe object provided to the user already comprises logic for the source data. In related art system, a user would be required to know about indexes, partitions, etc. to optimize query execution.

In some embodiments, the system prioritizes registration of data sources to the source dataframe. For example, a data system may comprise small caches of popular data sources may be implemented to increase performance. In response to detecting the small caches of popular data, the system determines whether such caches comprise data that can service the query. In response to detecting that a cache comprises data that can service the query (e.g., entirely service the query), the system prioritizes registration of such cache to the source dataframe for the source data. In response to determining that the system does not comprise a cache that can be used to service the query, the system may default back to a slower database.

FIGS. 8A-8C are diagrams of dataframes according to various embodiments of the present application. In various embodiments, a plurality of dataframes may be used to create other dataframes. As an example, if the system has first dataframe 800 and second dataframe 825, the system can generate third dataframe 850 by performing a union of first dataframe 800 and second dataframe 825 (e.g., third_dataframe=first_dataframe.union(second_dataframe))

.
Dataframes may be lazily evaluated. For example, the transformations performed with respect to dataframes can be saved until there is an action that requires a result, such as a request from a user for a result of query evaluation.

Figure 9:
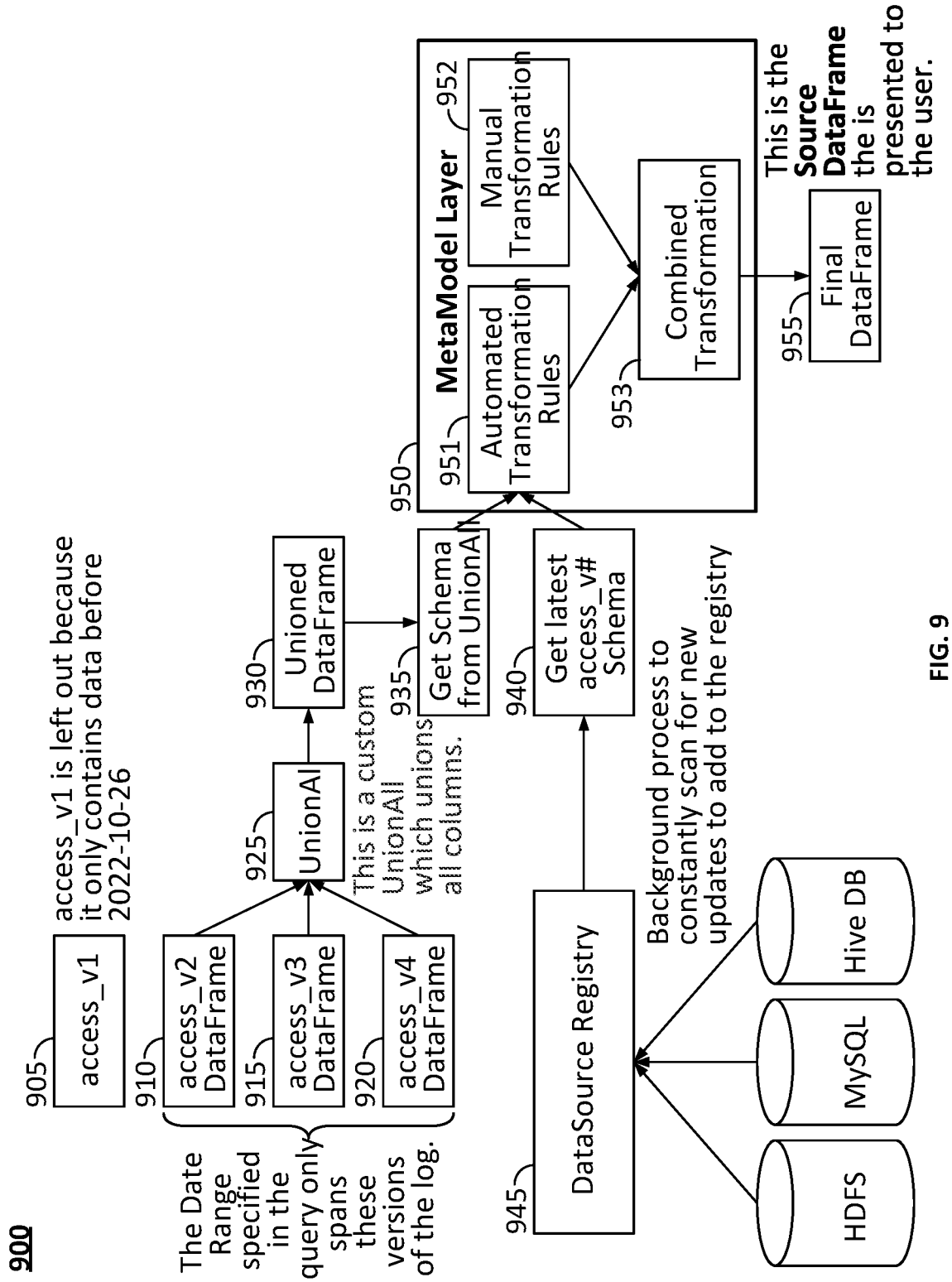
FIG. 9 is a diagram of a system for providing a dataframe as a service according to various embodiments of the present application.

FIG. 9 is a diagram of a system for providing a dataframe as a service according to various embodiments of the present application. In some embodiments, system 900 is implemented by system 100 of FIG. 1 and/or system 200 of FIG. 2.

In response to the user selecting logical table [access], the system enforces input of one or more parameters by which the system can identify the applicable physical tables associated with logical table [access]. In the example shown, the system determines dataframes 910, 915, and 920 corresponding to physical tables storing data applicable to the query. For example, the system determines that the physical table [access_v1] 905 is to be excluded because it stores data outside the specified date range. The system determines dataframes 910, 915, and 920 by internally creating a dataframe for each version of the data for logical table [access], excluding tables that do not contain data within the desired date range or that otherwise does not satisfy the one or more hints (e.g., input parameters).

In response to determining the dataframes corresponding to physical tables storing the data applicable to the query, at 925, the system determines union transformation to be performed with respect to dataframes 910, 915, and 920. For example, the union of dataframes 910, 915, and 920 performs a union of all columns in dataframes 910, 915, and 920. At 930, the system obtains the resulting dataframe or dataframe object (e.g., the unioned dataframe). In response to obtaining the unioned dataframe, at 935, the system determines a schema for the unioned dataframe. At 940, the system obtains a schema for the latest version of the table corresponding to logical table [access]. For example, the system queries data source registry 945 to determine the latest version of the table and a schema for the latest version. Data source registry 945 may perform a background process that scans continuously (or according to a predefined frequency) for new updates or datasets/tables to add to the registry.

In response to determining the schema for the unioned dataframe and the schema for the latest version of data for the logical table [access], the system determines a transformation to be performed to force the source dataframe to have a schema corresponding to the latest version of the data. For example, the system inputs the schema for the unioned dataframe and the schema for the latest version of data for the logical table [access] to a metamodel layer 950 that is configured to determine transformations for generating/configuring a source dataframe. Metamodel layer 950 applies one or more of automated transformation rules 951 and manual formation rules 952 to determine combined transformation 953 to be performed to the unioned dataframe to obtain the source dataframe (or to obtain the source dataframe object). At 955, metamodel layer 950 applies combined transformation 953 to obtain the source dataframe, or source dataframe object. The system provides the source dataframe to the user, which can use the source dataframe to perform transformations corresponding to an input query.

In some embodiments, the system saves execution of the source dataframe until the end so that the compute resources analyze the entire set of transformations to be applied and eliminate any unnecessary instructions or transformations.

Figure 10:
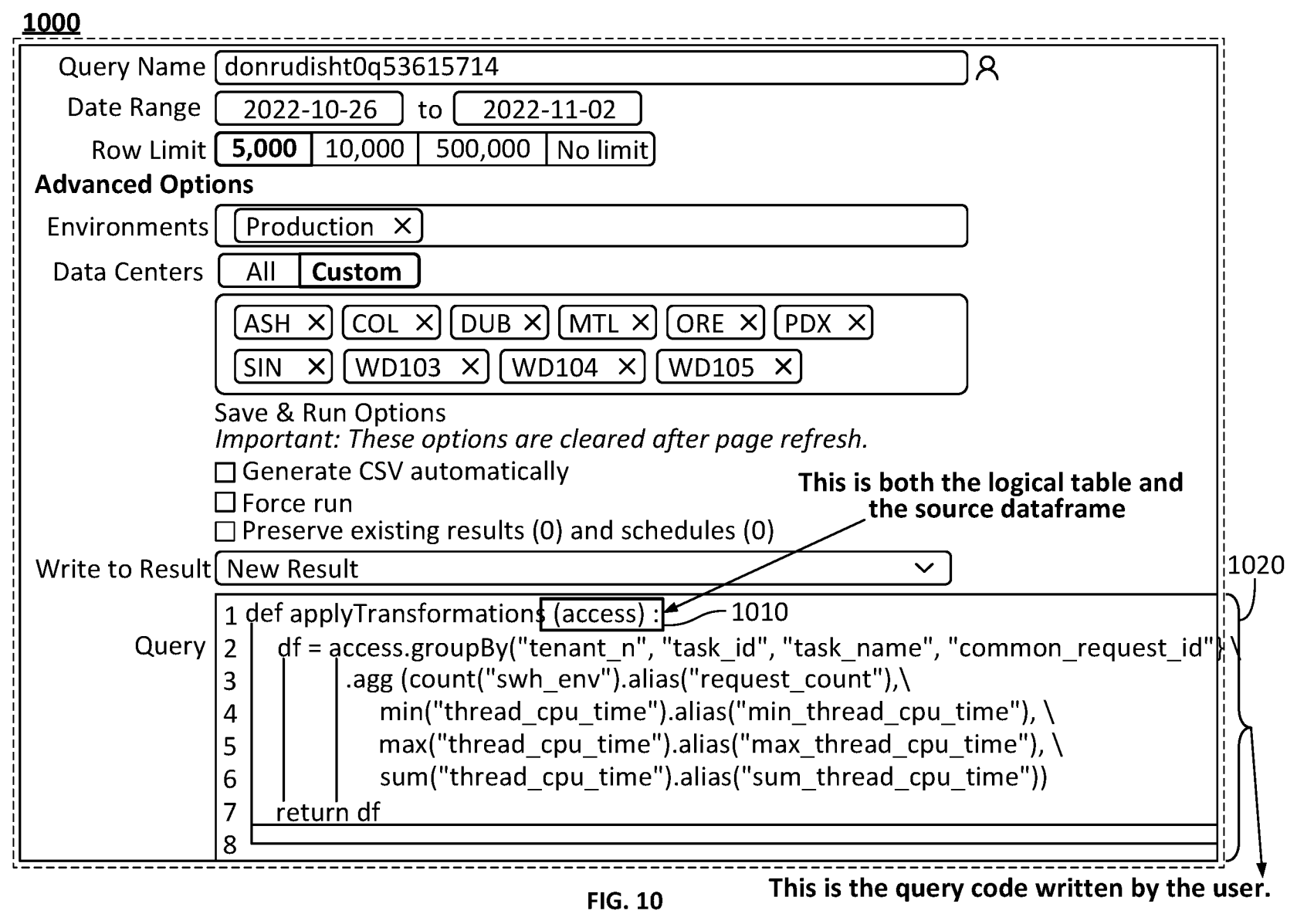

FIG. 10 is a diagram user interface used in connection with providing a dataframe as a service according to various embodiments of the present application. In response to determining the source data that the user is seeking to query, the system receives business logic for the query. For example, the system configures user interface 1000 to receive the business logic 1020 in association with the source dataframe 1010 (or source dataframe object).

Figure 11:
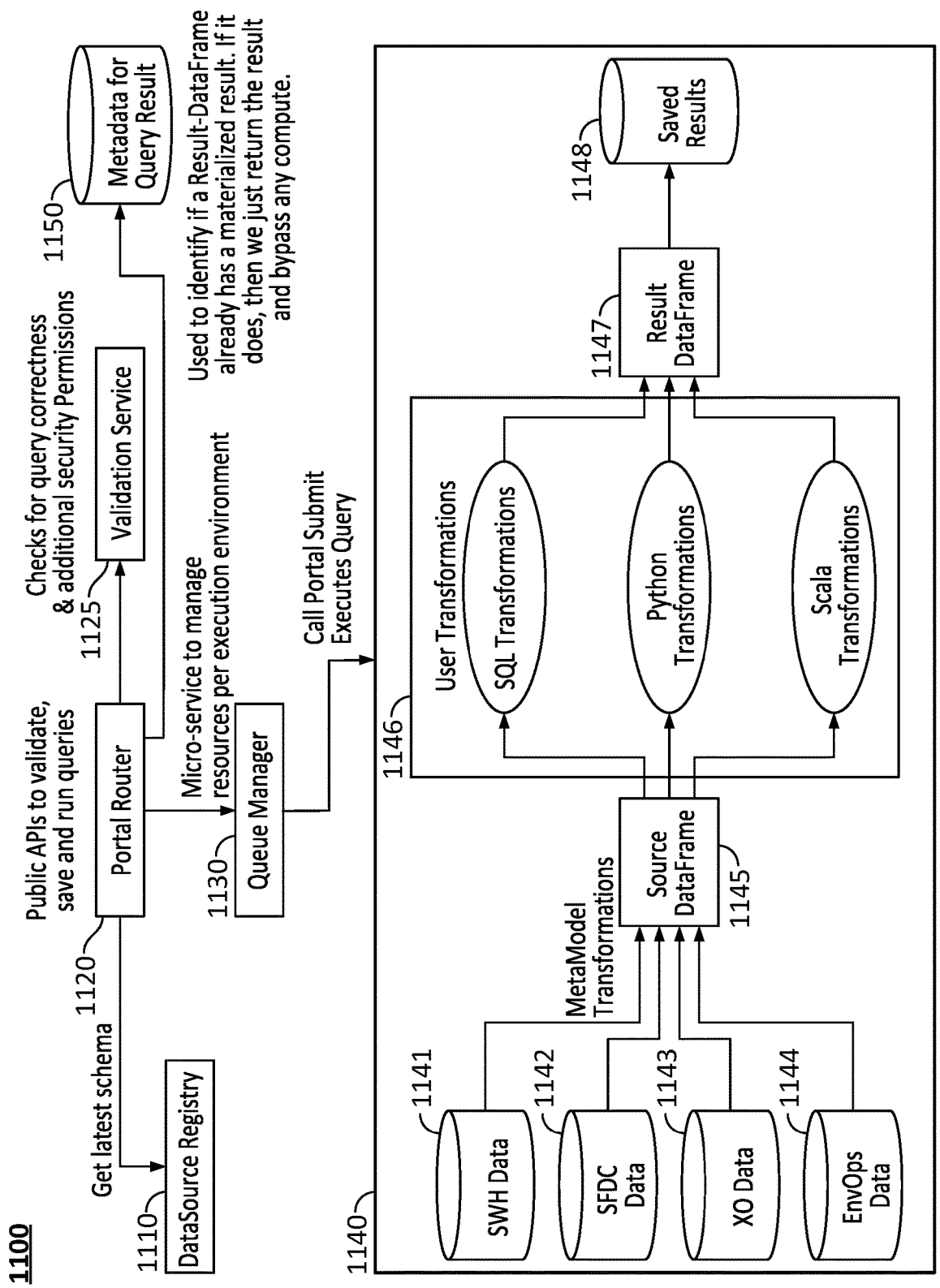
FIG. 11 is a diagram of a system for providing a dataframe as a service according to various embodiments of the present application.

FIG. 11 is a diagram of a system for providing a dataframe as a service according to various embodiments of the present application. In some embodiments, system 1100 is implemented at least in part by system 100 of FIG. 1 and/or system 200 of FIG. 2.

In response to determining the source data, system 1100 obtains a latest schema for the source data, such as by querying data source registry 1110. System validates, saves, and causes queries to be executed via portal router 1120. In response to determining to execute the query, system 1100 implements validation service 1125 that is configured to enforce one or more policies, such as one or more security process. Validation service 1125 ensures that information which the user does not have requisite permissions is appropriately masked. Validation service 1125 may mask the applicable data by applying transformation rules (or defining a set of transformation rules to be applied during runtime of the query). The transformation rules correspond to the policies being enforced, and can be performed against a column, a row, or a cell level of the source data. In some embodiments, validation service 1125 checks to ensure query correctness (e.g., to detect malicious code, etc.) and to perform any applicable permissions checks required by the underlying data system. Use of validation service 1125 allows system 1100 to abort a query before expending resources (e.g., compute resources, memory) associated with executing a query.

In response to validating the query using validation service 1125, system 1100 sends an indication from portal router 1120 to queue manager 1130, which manages the resources for an execution environment. In some embodiments, queue manager 1130 determines a set of compute resources to be implemented in connection with executing the query, and allocates the workload across the set of compute resources. As an example, queue manager 1130 may perform a function that encapsulates the user query payload into a new application (e.g., a Spark application) and submits the application to the cluster of compute resources (e.g., the Spark cluster). Queue manager 1130 monitors and governs execution of the application at query portal service 1140, and queue manager 1130 may provide status reports to the user, etc.

In some embodiments, queue manager 1130 is specifically tailored to the particular execution environment, and as a result queue manager 1130 can accommodate stability issues. For example, some execution environments outside of system 1100 control or otherwise unpredictable may intermittently fail jobs. In such environments, queue manager 1130 can enforce a set of automatic retries rather than merely allowing such jobs to fail. Related art systems require users to develop an application independent of their Spark application simply to supervise jobs being performed. Various embodiments abstract away this layer of supervision to a service provided by queue manager 1130 that can detect failures and automatically retry execution.

In response to determining that the particular query is ready for execution (e.g., in response to a determination that prior queries in the queue are complete, or that compute resources are available to process the particular query), system 1100 provide the query to query portal service 1140. Query portal service obtains applicable dataframes from one or more data sources 1141-1144 and determines a source dataframe 1145. At 1146, query portal service 1140 translates the business logic input by the user to determine transformations to be performed on the source data in connection with executing the query. System 1100 may be configured to identify a programming language according to which the business logic is input, and thereafter determine a set of corresponding transformations to be applied based at least in part on the programming language(s). As an example, the system stores a mapping(s) of programming languages to transformations (e.g., for a particular logic or operation), and in response to determining the programming language in which the query is input, the system queries the mapping for the applicable transformations. In response to performing the transformations (e.g., evaluating the query), query portal service 1140 obtains a result dataframe 1147 and stores the result dataframe to a data source 1148. In some embodiments, system 1100 provides the result to the user via providing a result identifier that is associated with a logical table corresponding to the results.

If system 1100 determines that the result dataframe 1147 comprises a result, system 1100 bypasses the compute and returns the result. System 1100 may determines that result dataframe 1147 comprises a materialized result by querying a metadata for query results 1150.

Figure 12:
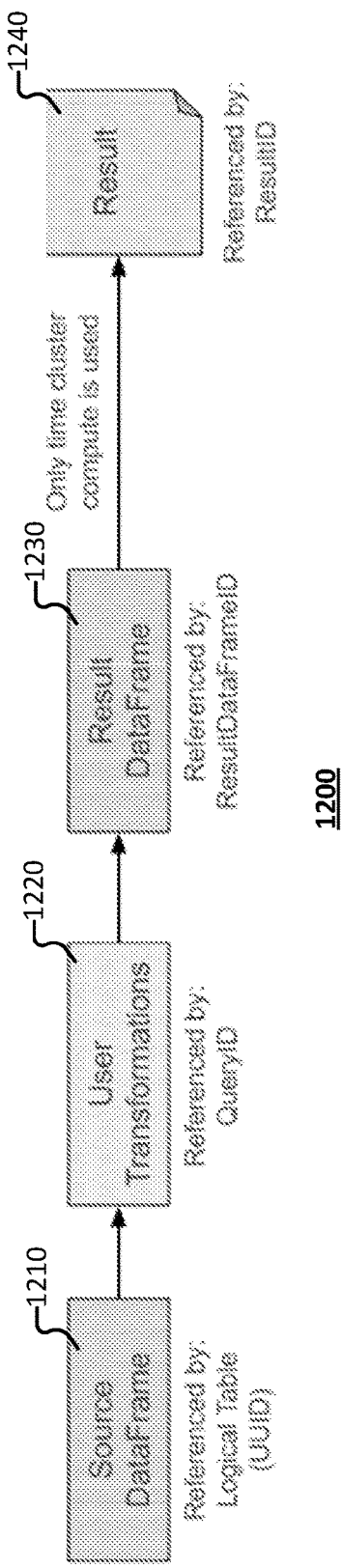
FIG. 12 is a block diagram of a method for providing a dataframe as a service according to various embodiments of the present application.

FIG. 12 is a block diagram of a method for providing a dataframe as a service according to various embodiments of the present application. Method 1200 illustrates lazy evaluation of dataframes. In various embodiments, compute resources are not expended until the system receives a request for a result of the query.

In the example shown, source dataframe 1210 is obtained, such as in response to determining the source data against which the user desires to execute a query. Source dataframe 1210 (or a corresponding source dataframe object) is provided to the user and the user inputs the business logic, such as a query corresponding to user transformations 1220. The business logic may be associated with a query identifier. In response to receiving user transformations 1220, the system generates result dataframe 1230 (or a result dataframe object) corresponding to user transformations 1220 and any other required transformations, such as those enforced by a security policy, being applied to the applicable source data. The system executes the query by evaluating result dataframe 1230 to obtain result 1240 in response to the system receiving a request for the result.

Figure 13:
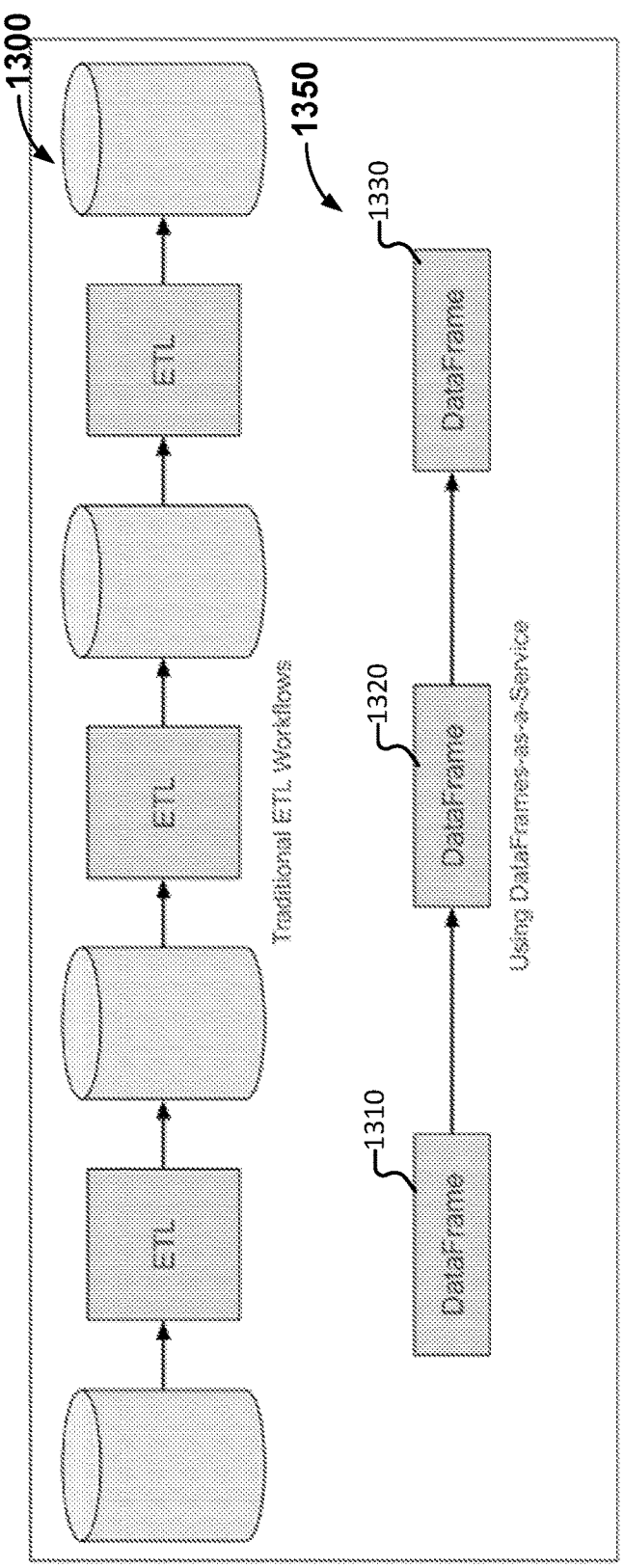
FIG. 13 is a block diagram of a method for providing a dataframe as a service according to various embodiments of the present application.

FIG. 13 is a block diagram of a method for providing a dataframe as a service according to various embodiments of the present application. In the example shown, process 1350 implemented by various embodiments is contrasted with a related art process 1300.

In related art systems, organizations (e.g., development teams) use systems that would create complex workflows to explicitly extract data from a system, run some processing, and then store those results. If any additional processing is required, the related art systems reload the newly stored data, run more processing, and store it gain. Process 1300 continues until the desired result is obtained. In addition to being inefficient during runtime, process 1300 requires organizations to have intimate knowledge of each layer of the data platform. In contrast, process 1350 according to various embodiments can chain multiple result dataframes and eliminate the iterative process required by process 1300. In the example shown, the system uses process 1350 to chain dataframes 1310, 1320, and 1330 before evaluation. By waiting until the end to perform the executions, the compute runtime to evaluate the query and obtain the result is able to analyze the chain of dataframes (e.g., dataframes 1310-1330) and eliminate any unnecessary computations required to produce the result.

Figure 14:
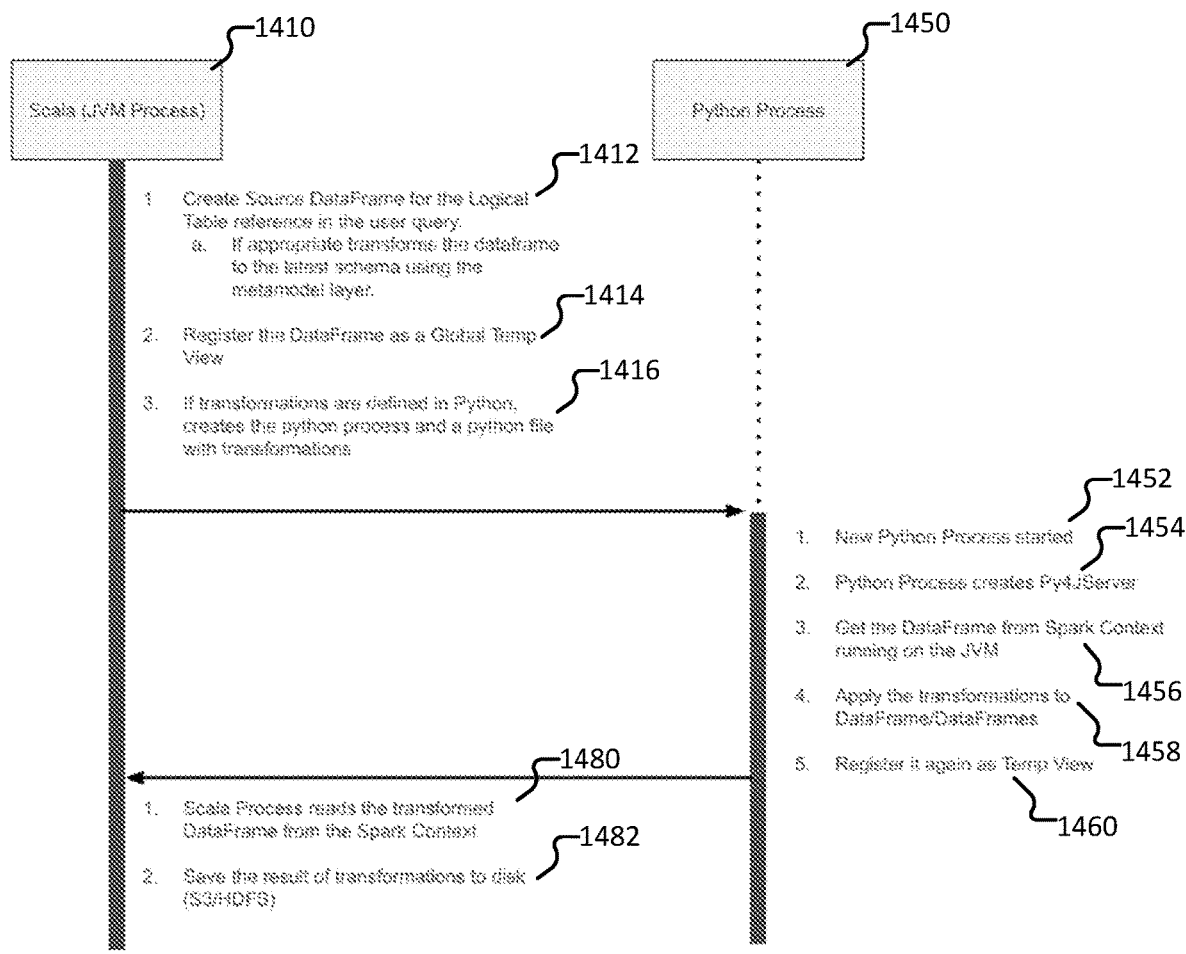
FIG. 14 is a flow diagram of a method for providing a dataframe as a service according to various embodiments of the present application.

FIG. 14 is a flow diagram of a method for providing a dataframe as a service according to various embodiments of the present application. In some embodiments, process 1400 is implemented by system 100 of FIG. 1 and/or system 200 of FIG. 2.

According to various embodiments, the system is configured to receive the business logic in one or more programming languages. In the example shown, process 1400 is implemented to apply user transformations in python on Scala dataframes. Process 1400 comprises a Scala process 1410 and python process 1450 that are implemented in combination to perform business logic input in Python to Scala dataframes.

At 1412, Scala process 1410 creates a source dataframe. The source dataframe corresponds to a logical table reference in the user query (e.g., the business logic). In some embodiments, the system implements a set of transformations to the source data (e.g., the source tables) to enforce the schema for the latest version of the logical table on the source dataframe.

At 1414, the source dataframe is registered as a global temp view to facilitate sharing of data.

At 1416, in response to determining that the business logic is input in Python (e.g., that the business logic comprises Python transformations), the system creates Python process 1450. The system may further create a Python file comprising the corresponding business logic. The transformations are then provided to Python process 1450 (e.g., the Python file is executed using Python process 1450).

At 1452, a new Python process is started.

At 1454, the Python process creates a gateway between Python and a Java virtual machine (JVM). For example, a JavaGateway is used to access the JVM to execute the transformations.

At 1456, the source dataframe is obtained from the cluster of compute resources (e.g., a Spark context) that is running the JVM.

At 1458, Python process 1450 applies the transformations to the source dataframe.

At 1460, the resulting dataframe (e.g., the dataframe in which the transformations are applied to the source dataframe) is registered as a temp view.

Python process 1450 may provide Scala process 1410 with an indication that the execution of the transforms is complete.

At 1480, Scala process 1410 reads the transformed dataframe from the compute resources (e.g., from the Spark context).

At 1482, Scala process 1410 stores the result of transformations.

Although process 1400 implements the execution of transformations in Python, a similar process may be implemented for other programming languages. In some embodiments, the system may implement a plurality of processes corresponding to different programming languages.

Figure 15:
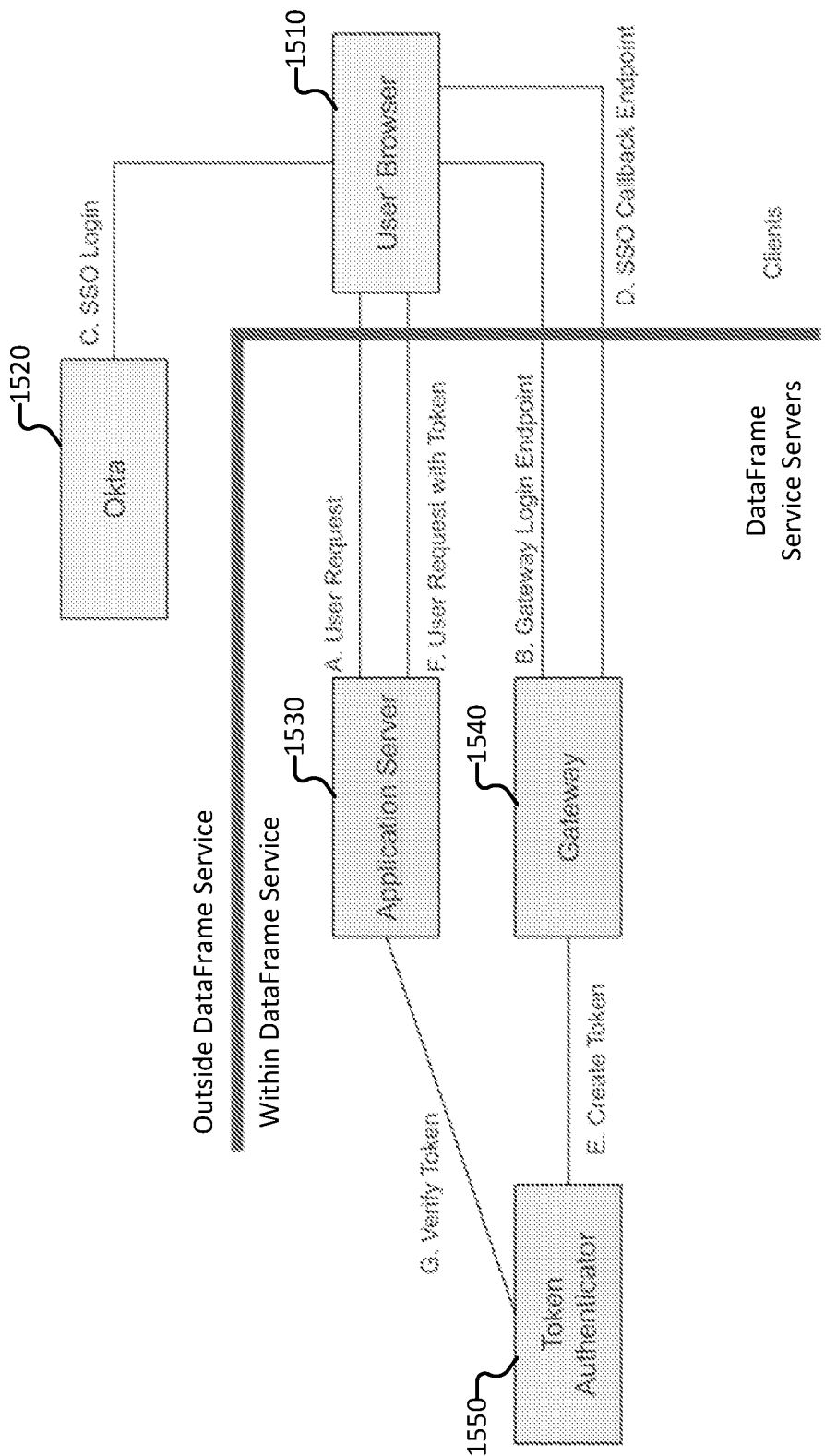
FIG. 15 is a block diagram of a system for providing a dataframe as a service according to various embodiments of the present application.

FIG. 15 is a block diagram of a system for providing a dataframe as a service according to various embodiments of the present application. In some embodiments, system 1500 is implemented at least in part by system 100 of FIG. 1 and/or system 200 of FIG. 2.

As illustrated, system 1500 comprises components within the dataframe service and/or components outside the dataframe service.

Components outside the dataframe service of system 1500 comprise a browser 1510 provided on a client system. A user navigates browser 1510 to access the dataframe service. In connection with accessing the dataframe service, browser 1510 communicates various authentication information, such as tokens, credentials, etc. The components outside the dataframe service of system 1500 may further comprise single sign on module 1520 that is used for authentication and authorization to services within the dataframe service. The use of a single sign on module 1520 may enable system 1500 to reconcile discrepancies in usernames for users across different directory services. For example, in some instances, one system may truncate a username, such as to enforce character limitations, and in other systems, the usernames are fully provided.

Components within the dataframe service of system 1500 comprise application server 1530, gateway 1540, and/or token authenticator 1550. Gateway 1540 and token authenticator 1550 may reside under the same domain because modern web stack silos and restricts cookies for each domain. By residing under the same domain, gateway 1540 and token authenticator 1550 may read and write cookies that may be used to pass an authentication token and redirect URL.

In connection with accessing the dataframe service, the user navigates browser 1510 to request access from application server 1530. In response to the access request, browser 1510 and gateway 1540 communicate. For example, application server 1530 redirects browser 1510 to gateway 1540 to obtain a token. In response to receiving a request for a token based on the redirect of the browser 1510 to gateway 1540, gateway 1540 redirects browser 1510 to single sign on module 1520 to obtain a session for accessing the service. In response to receiving the login credential request, browser 1510 communicates with single sign on module 1520 to obtain a token. For example, browser 1510 provides a password and two factor authentication to single sign on module 1520 in connection with authentication of the user. In response to authenticating the user, browser 1510 is provided with a session with single sign on module 1520. In response to receiving the session with single sign on module 1520, browser 1510 provides information pertaining to the session to gateway 1540 for authentication with respect to the dataframe service. For example, single sign on module 1520 redirects browser 1510 to gateway 1540 upon authentication of the user. In response to receiving the redirect of browser 1510 from single sign on module 1520 and/or session information, gateway 1540 generates a token, such as by requesting from token authenticator 1550 a token to be generated for the session. Token authenticator 1550 provides the token to gateway 1540, which in turn provides the token to browser 1510. In response to authenticating the user via the session with single sign on module 1520, token authenticator 1550 generates a token, which is provided to browser 1510. In response to receiving the token, browser 1510 communicates to application server 1530 the access request with the token. For example, in connection with providing browser 1510 with the token, gateway 1540 redirects browser 1510 to application server 1530. In response to receiving the access request and the token, application server 1530 provides the token to token authenticator 1550 for authentication. Token authenticator 1550 may cross-check the token with its own maintained values stored in connection with the generation of the token. In response to the token being verified/authenticated, application server 1530 provides the dataframe service to browser 1510.

Figure 16A:
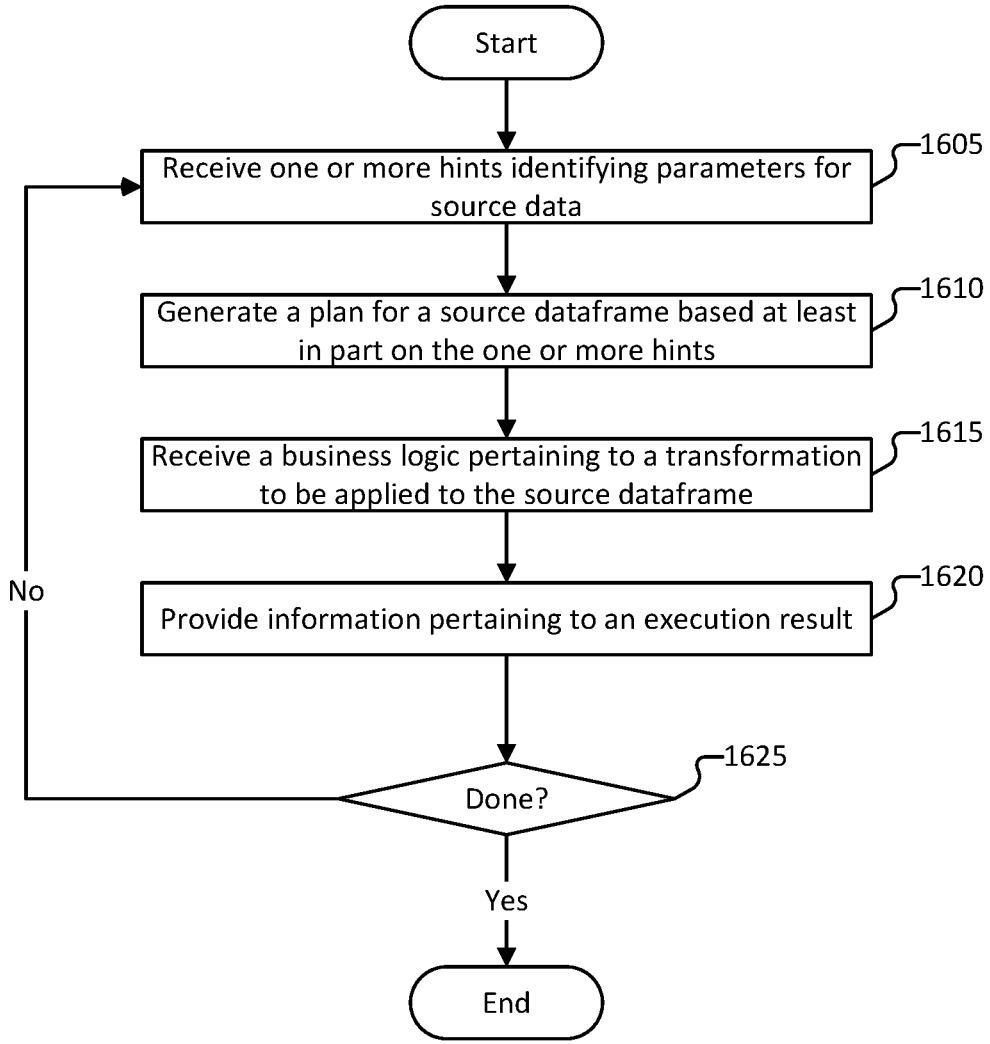
FIG. 16A is a flow diagram of a method for providing a dataframe as a service according to various embodiments of the present application.

FIG. 16A is a flow diagram of a method for providing a dataframe as a service according to various embodiments of the present application. In some embodiments, process 1600 is implemented at least in part by system 100 of FIG. 1 and/or system 200 of FIG. 2.

At 1605, one or more hints identifying parameters for source data are received. In some embodiments, the client system provides, via a user interface, a set of hints to the system (e.g., the dataframe service). The hints may include a selection of a logical table or other information from which the system is able to infer the logical table. In response to receiving selection of the logical table, the system determines one or more required hints (e.g., input parameters). For example, the system queries a data source registry for an indication of the required hints for the logical table.

At 1610, a plan for a source dataframe is generated based at least in part on the one or more hints. In some embodiments, the generation of the plan for the source data includes determining a source dataframe, such as determining configurations of the source dataframe or otherwise generating a corresponding source dataframe logic. The source dataframe object may be provided to the client system.

At 1615, business logic pertaining to a transformation to be applied to the source dataframe is received. In some embodiments, system receives the business logic from client system via a query written to the source dataframe object.

At 1620, information pertaining to the execution result is provided. In response to receiving the source dataframe object comprising the business logic, the system determines a set of transformations to apply to the source data, and obtains an execution result. The system may determine a result dataframe pertaining to the execution result. The result may be stored in a dataset and the system may provide a result identifier associated with the result for the client system to use in accessing the results.

At 1625, a determination is made as to whether process 1600 is complete. In some embodiments, process 1600 is determined to be complete in response to a determination that no further dataframes are to be provided, no business logic for generating/obtaining a dataframe is received (e.g., within a threshold period of time), the processing of the evaluation of the business logic is complete, the user has exited the system, an administrator indicates that process 1600 is to be paused or stopped, etc. In response to a determination that process 1600 is complete, process 1600 ends. In response to a determination that process 1600 is not complete, process 1600 returns to 1605.

Figure 16B:
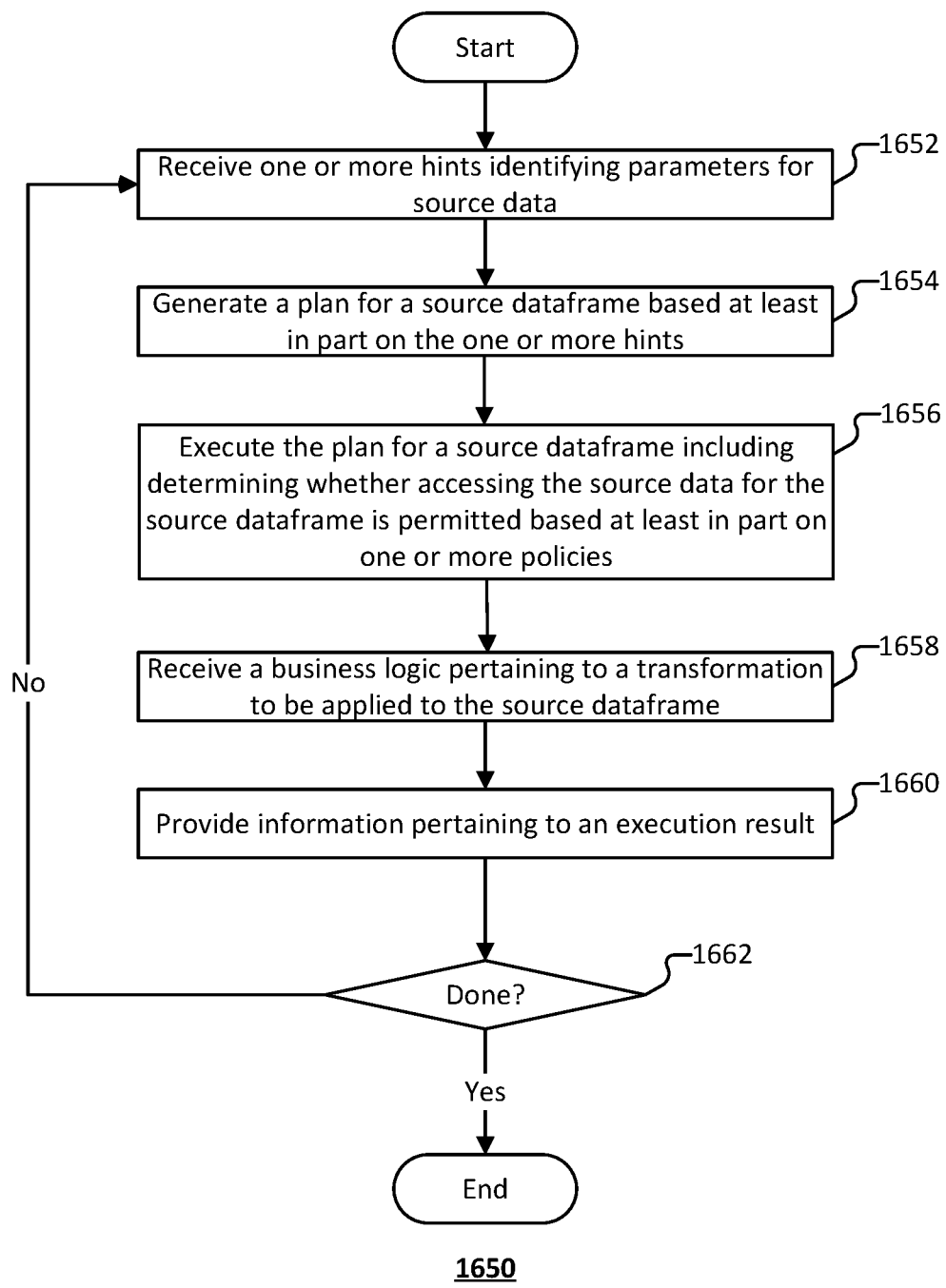
FIG. 16B is a flow diagram of a method for providing a dataframe as a service according to various embodiments of the present application.

FIG. 16B is a flow diagram of a method for providing a dataframe as a service according to various embodiments of the present application. In some embodiments, process 1650 is implemented at least in part by system 100 of FIG. 1 and/or system 200 of FIG. 2.

At 1652, one or more hints identifying parameters for source data are received. In some embodiments, the client system provides, via a user interface, a set of hints to the system (e.g., the dataframe service). The hints may include a selection of a logical table or other information from which the system is able to infer the logical table. In response to receiving selection of the logical table, the system determines one or more required hints (e.g., input parameters). For example, the system queries a data source registry for an indication of the required hints for the logical table.

At 1654, a plan for a source dataframe is generated based at least in part on the one or more hints. In some embodiments, the generation of the plan for the source data includes determining a source dataframe, such as determining configurations of the source dataframe or otherwise generating a corresponding source dataframe logic. The source dataframe object may be provided to the client system.

At 1656, the plan for the source dataframe is executed including determining whether accessing the source data for the source dataframe is permitted based at least in part on one or more security policies. In some embodiments, accessing the source data for the source dataframe is permitted or not permitted based at least in part on permissions associated with the user requesting the execution of business logic pertaining to a transformation to be applied to the source dataframe. For example, credentials supplied by the user on login, on requesting the execution, on indicating the hints for data source(s) (e.g., credential(s) for accessing one or more data sources), or any other appropriate indication of authorization, permission, or access credentials are used to determine permitted access to source data for the source dataframe. In various embodiments, a security policy comprises a login policy, a user permissions policy tied to login credentials, a user permission policy tied to a data source credential, a user permission policy tied to a role permissions (e.g., a role permission associated with a user identifier), a user permission policy tied to organization permissions (e.g., organization permissions tied to an organizational identifier), or any other appropriate policy tied to the user, the request, the data, or any other appropriate system parameter. In response to determining that access is permitted by the process to the source data, the source data is associated with or loaded into the source dataframe.

At 1658, business logic pertaining to a transformation to be applied to the source dataframe is received. In some embodiments, system receives the business logic from client system via a query written to the source dataframe object.

In some embodiments, the business logic is analyzed and it is determined whether to restrict execution of at least part of the business logic deemed to be malicious. The system may use one or more heuristics or query a model for detecting malicious code (e.g., a classification model that classifies the code as malicious or benign, etc.). As an example, in response to determining that the business logic or a portion of the business logic includes malicious code, the system determines not to execute the business logic or a portion of the business logic. In some embodiments, the system determines the business logic input to the source dataframe is malicious. For example, the system performs a classification of maliciousness with respect to the business logic.

At 1660, information pertaining to the execution result is provided. In response to receiving the source dataframe object comprising the business logic, the system determines a set of transformations to apply to the source data and obtains an execution result. The system may determine a result dataframe pertaining to the execution result. The result may be stored in a dataset and the system may provide a result identifier associated with the result for the client system to use in accessing the results.

At 1662, a determination is made as to whether process 1650 is complete. In some embodiments, process 1650 is determined to be complete in response to a determination that no further dataframes are to be provided, no business logic for generating/obtaining a dataframe is received (e.g., within a threshold period of time), the processing of the evaluation of the business logic is complete, the user has exited the system, an administrator indicates that process 1650 is to be paused or stopped, etc. In response to a determination that process 1650 is complete, process 1650 ends. In response to a determination that process 1650 is not complete, process 1650 returns to 1652.

In various embodiments, the one or more security policies are enforced based at least in part on one or more of the following: not on a user identifier, on a user credential, on a user login credential, on a source data credential, on a user role, on a role credential, on an organization identifier, on an organization credential, or any other appropriate system identifier or credential associated with the user or system requestor.

Figure 16C:
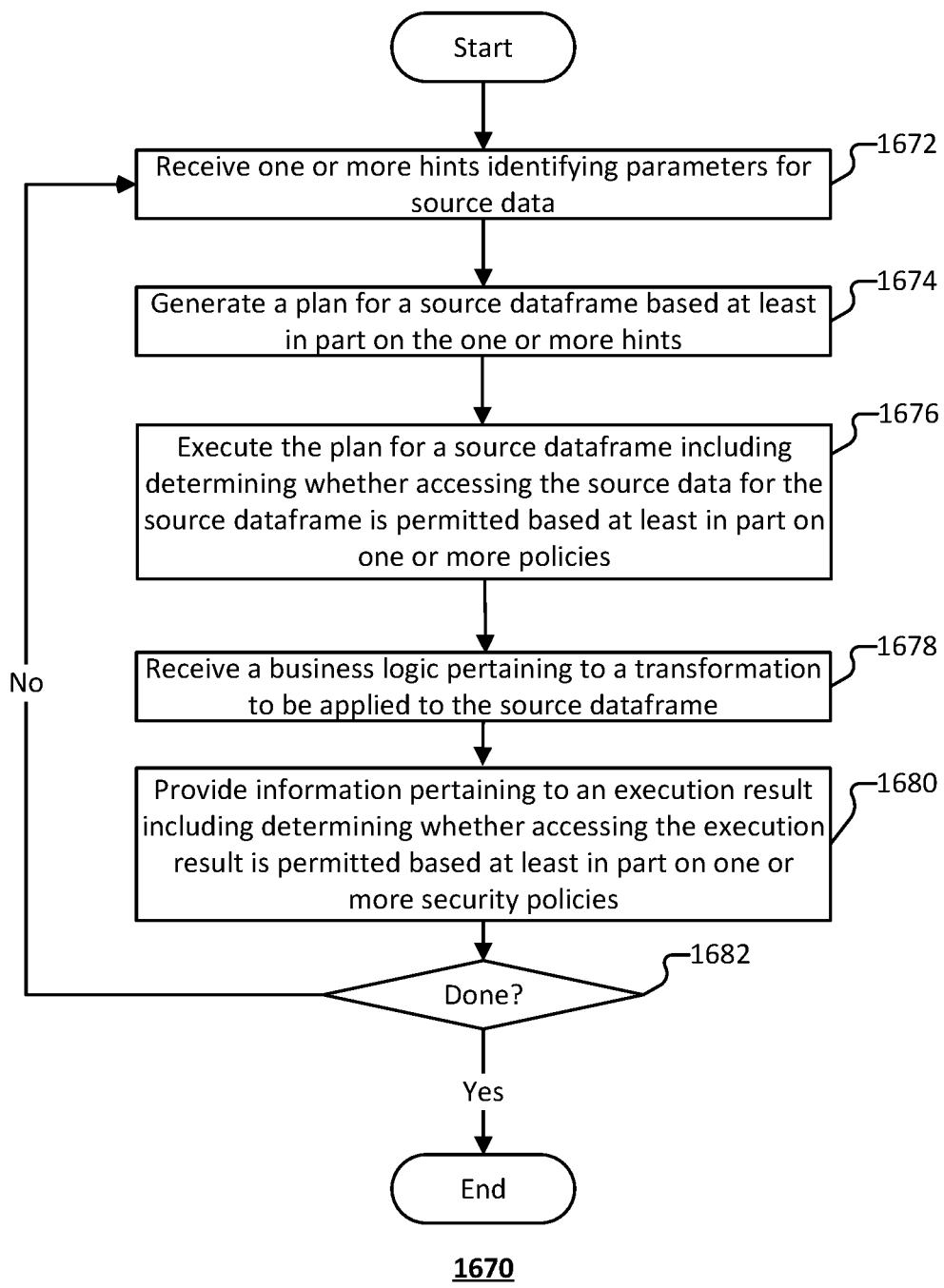
FIG. 16C is a flow diagram of a method for providing a dataframe as a service according to various embodiments of the present application.

FIG. 16C is a flow diagram of a method for providing a dataframe as a service according to various embodiments of the present application. In some embodiments, process 1670 is implemented at least in part by system 100 of FIG. 1 and/or system 200 of FIG. 2.

At 1672, one or more hints identifying parameters for source data are received. In some embodiments, the client system provides, via a user interface, a set of hints to the system (e.g., the dataframe service). The hints may include a selection of a logical table or other information from which the system is able to infer the logical table. In response to receiving selection of the logical table, the system determines one or more required hints (e.g., input parameters). For example, the system queries a data source registry for an indication of the required hints for the logical table.

At 1674, a plan for a source dataframe is generated based at least in part on the one or more hints. In some embodiments, the generation of the plan for the source data includes determining a source dataframe, such as determining configurations of the source dataframe or otherwise generating a corresponding source dataframe logic. The source dataframe object may be provided to the client system.

At 1676, the plan for the source dataframe is executed including determining whether accessing the source data for the source dataframe is permitted based at least in part on one or more security policies. In some embodiments, executing the plan does not include determining whether accessing the source data for the source dataframe is permitted based at least in part on the one or more policies. In some embodiments, accessing the source data for the source dataframe is permitted or not permitted based at least in part on permissions associated with the user requesting the execution of business logic pertaining to a transformation to be applied to the source dataframe. For example, credentials supplied by the user on login, on requesting the execution, on indicating the hints for data source(s) (e.g., credential(s) for accessing one or more data sources), or any other appropriate indication of authorization, permission, or access credentials are used to determine permitted access to source data for the source dataframe. In various embodiments, a security policy comprises a login policy, a user permissions policy tied to login credentials, a user permission policy tied to a data source credential, a user permission policy tied to role permissions associated with a user identifier, a user permission policy tied to permissions tied to an organizational identifier, or any other appropriate policy tied to the user, the request, the data, or any other appropriate system parameter. In response to determining that access is permitted by the process to the source data, the source data is associated with or loaded into the source dataframe.

At 1678, business logic pertaining to a transformation to be applied to the source dataframe is received. In some embodiments, system receives the business logic from client system via a query written to the source dataframe object.

In some embodiments, the business logic is analyzed and it is determined whether to restrict execution of at least part of the business logic deemed to be malicious. The system may use one or more heuristics or query a model for detecting malicious code (e.g., a classification model that classifies the code as malicious or benign, etc.). As an example, in response to determining that the business logic or a portion of the business logic includes malicious code, the system determines not to execute the business logic or a portion of the business logic. In some embodiments, the system determines the business logic input to the source dataframe is malicious. For example, the system performs a classification of maliciousness with respect to the business logic.

At 1680, information pertaining to the execution result is provided including determining whether accessing the execution result is permitted based at least in part on one or more security policies. In response to receiving the source dataframe object comprising the business logic, the system determines a set of transformations to apply to the source data, and obtains an execution result. The system may determine a result dataframe pertaining to the execution result. The system determines the portion(s) of the execution result that the requesting user has permission to access. In various embodiments, the execution results are masked, deleted, marked as inaccessible, marked as accessible, or any other appropriate status based on one or more security policies. The result may be stored in a dataset and the system may provide a result identifier associated with the result for the client system to use in accessing the results.

In some embodiments, accessing the portion(s) of the execution result is permitted or not permitted based at least in part on permissions associated with the user requesting the execution of business logic pertaining to a transformation to be applied to the source dataframe. For example, credentials supplied by the user on login, on requesting the execution, on indicating the hints for data source(s) (e.g., credential(s) for accessing one or more data sources), or any other appropriate indication of authorization, permission, or access credentials are used to determine permitted access to the portion(s) of the execution result. In various embodiments, a security policy comprises a login policy, a user permissions policy tied to login credentials, a user permission policy tied to a data source credential, a user permission policy tied to role permissions associated with a user identifier, a user permission policy tied to permissions tied to an organizational identifier, or any other appropriate policy tied to the user, the request, the data, or any other appropriate system parameter.

At 1682, a determination is made as to whether process 1670 is complete. In some embodiments, process 1670 is determined to be complete in response to a determination that no further dataframes are to be provided, no business logic for generating/obtaining a dataframe is received (e.g., within a threshold period of time), the processing of the evaluation of the business logic is complete, the user has exited the system, an administrator indicates that process 1670 is to be paused or stopped, etc. In response to a determination that process 1670 is complete, process 1670 ends. In response to a determination that process 1670 is not complete, process 1670 returns to 1672.

In various embodiments, the one or more security policies are enforced based at least in part on one or more of the following: not on a user identifier, on a user credential, on a user login credential, on a source data credential, on a user role, on a role credential, on an organization identifier, on an organization credential, or any other appropriate system identifier or credential associated with the user or system requestor.

Figure 17:
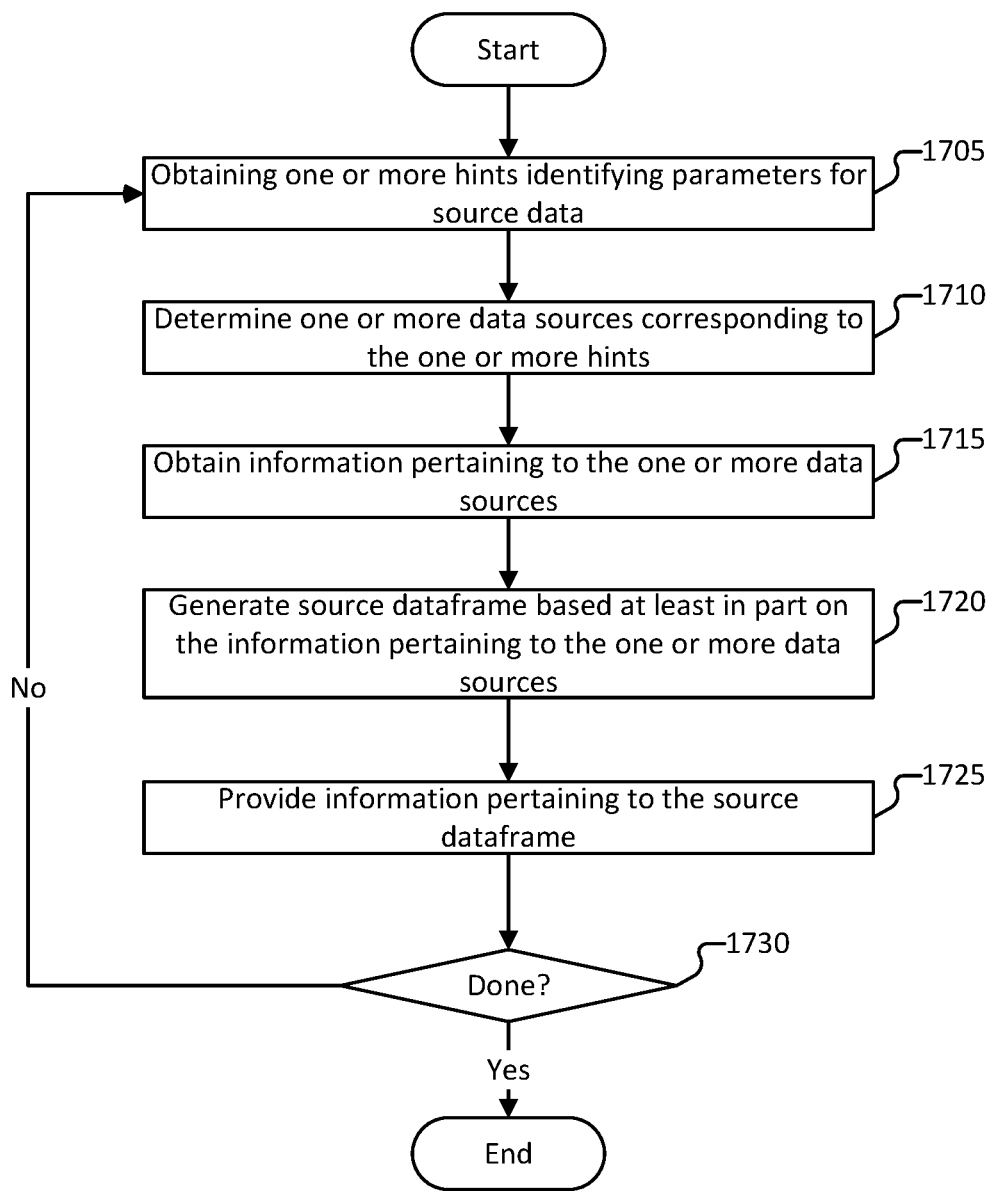
FIG. 17 is a flow diagram of a method for determining a data source(s) in connection with providing a dataframe as a service according to various embodiments of the present application.

FIG. 17 is a flow diagram of a method for determining a data source(s) in connection with providing a dataframe as a service according to various embodiments of the present application. In some embodiments, process 1700 is implemented at least in part by system 100 of FIG. 1 and/or system 200 of FIG. 2.

In some embodiments, process 1700 is invoked by 1610 of process 1600.

At 1705, one or more hints identifying the parameters for the data source is obtained. At 1710, one or more data sources corresponding to the one or more hints is determined. For example, the system determines the source data that is to be used in connection with evaluating the query (e.g., the business logic). At 1715, information pertaining to the one or more data sources is obtained. At 1720, a source dataframe is generated based at least in part on the information pertaining to the one or more data sources. For example, the system obtains a unioned dataframe corresponding to information stored in a plurality of tables storing the source data. In some embodiments, the system determines a set of transformations to be applied with respect the unioned dataframe, such as transformations required to force the dataframe to comply with a schema associated with a last version of the logical table identified as being associated with source data. At 1725, information pertaining to the source dataframe is provided. In some embodiments, the system provides a source dataframe object, which the client system uses to input associated business logic. At 1730, a determination is made as to whether process 1700 is complete. In some embodiments, process 1700 is determined to be complete in response to a determination that no further dataframes are to be provided, no business logic for generating/obtaining a dataframe is received (e.g., within a threshold period of time), the processing of the evaluation of the business logic is complete, the user has exited the system, an administrator indicates that process 1700 is to be paused or stopped, etc. In response to a determination that process 1700 is complete, process 1700 ends. In response to a determination that process 1700 is not complete, process 1700 returns to 1705.

Figure 18:
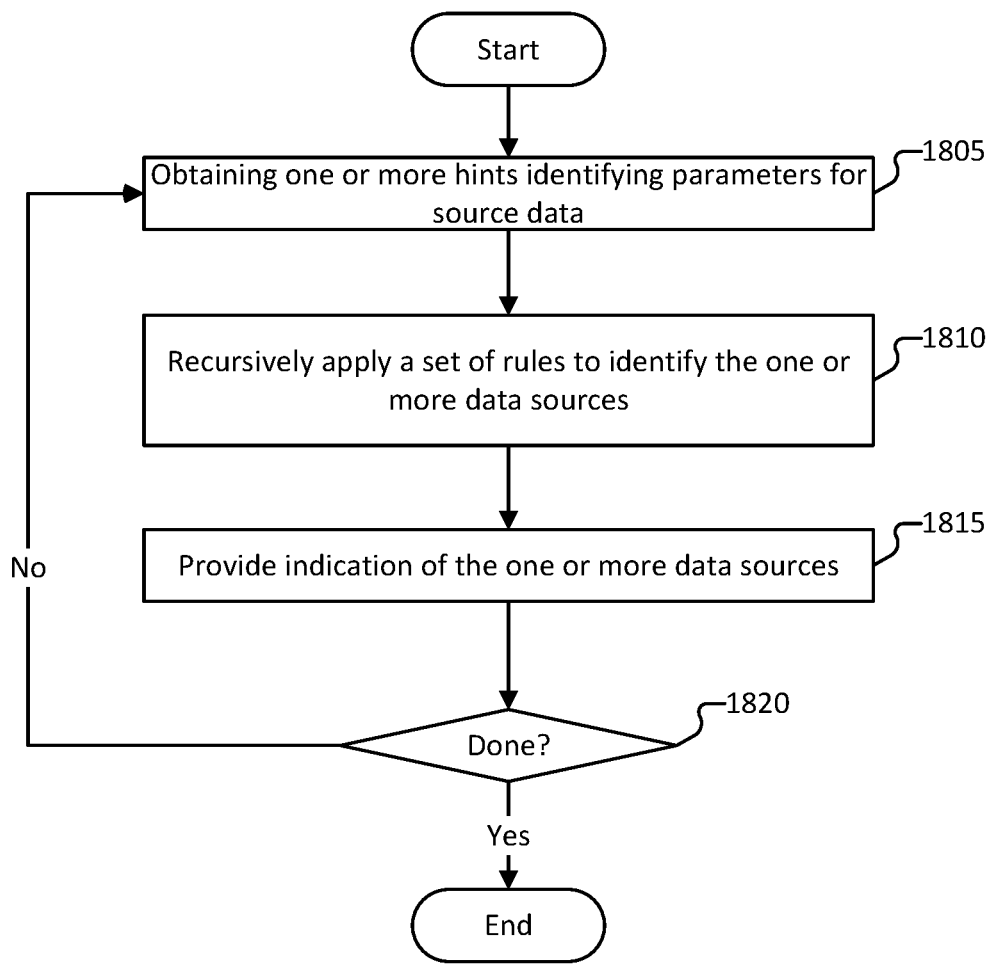
FIG. 18 is a flow diagram of a method for determining a data source(s) in connection with providing a dataframe as a service according to various embodiments of the present application.

FIG. 18 is a flow diagram of a method for determining a data source(s) in connection with providing a dataframe as a service according to various embodiments of the present application. In some embodiments, process 1800 is implemented at least in part by system 100 of FIG. 1 and/or system 200 of FIG. 2.

In some embodiments, process 1800 is invoked by 1710 of process 1700.

At 1805, one or more hints identifying parameters for the source data are obtained. At 1810, in response to obtaining the one or more hints, the system recursively applies a set of rules to identify the one or more data sources comprising source data. As an example, the system may receive a first hint and in response to obtaining the first hint, the system determines one or more other required hints for the system to infer the source data (e.g., such one or more other hints may include date ranges, environment type, data center, etc.). Based on the first hint and the one or more other required hints, the system determines one or more data source comprising the source data, such as a set of physical tables storing information associated with the query. At 1815, an indication of the one or more data sources are provided. For example, each data source may have an associated UUID, which is used to identify the data source(s). At 1820, a determination is made as to whether process 1800 is complete. In some embodiments, process 1800 is determined to be complete in response to a determination that no further data sources storing source data for queries are to be provided, no business logic for generating/obtaining a dataframe is received (e.g., within a threshold period of time), the processing of the evaluation of the business logic is complete, the user has exited the system, an administrator indicates that process 1800 is to be paused or stopped, etc. In response to a determination that process 1800 is complete, process 1800 ends. In response to a determination that process 1800 is not complete, process 1800 returns to 1805.

Figure 19:
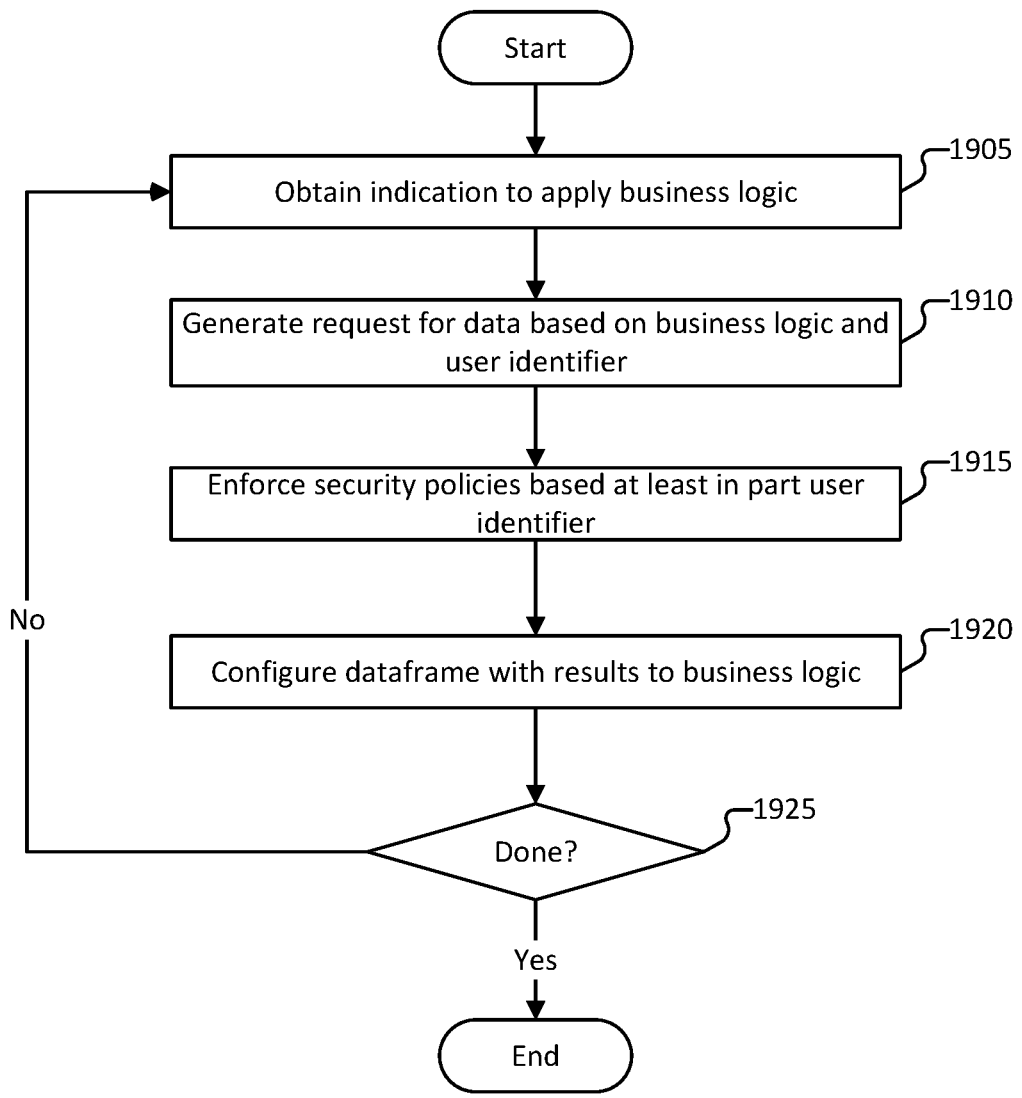
FIG. 19 is a flow diagram of a method for evaluating business logic in connection with providing a dataframe as a service according to various embodiments of the present application.

FIG. 19 is a flow diagram of a method for evaluating business logic in connection with providing a dataframe as a service according to various embodiments of the present application. In some embodiments, process 1900 is implemented at least in part by system 100 of FIG. 1 and/or system 200 of FIG. 2.

In some embodiments, process 1900 is invoked by 1620 of process 1600.

At 1905, an indication to apply business logic is obtained. In some embodiments, the system receives the indication to apply the business logic in connection with the client system providing a request for a result for the query associated with the business logic (e.g., a request for the system to run the business logic). At 1910, in response to receiving the indication to apply the business logic, the system generates a request for data based on the business logic and the user identifier (e.g., a credential associate with the user to enforce permissions and security policies). At 1915, one or more security policies are enforced based at least in part on the user identifier. In some embodiments, the system enforces at the database level a check on whether the corresponding user has permission to access the source data. In some embodiments, the system enforces a policy to mask certain information, such as PII or other designated sensitive information. In various embodiments, the one or more security policies are enforced based at least in part on one or more of the following: not on a user identifier, on a user credential, on a user login credential, on a source data credential, on a user role, on a role credential, on an organization identifier, on an organization credential, or any other appropriate system identifier or credential associated with the user or system requestor. At 1920, a dataframe with the results to the business logic is configured. In some embodiments, the system configures the result dataframe that upon evaluation obtains the results for the query. At 1925, a determination is made as to whether process 1900 is complete. In some embodiments, process 1900 is determined to be complete in response to a determination that no further results are to be provided, no further queries are to be executed, no business logic for generating/obtaining a dataframe is received (e.g., within a threshold period of time), the processing of the evaluation of the business logic is complete, the user has exited the system, an administrator indicates that process 1900 is to be paused or stopped, etc. In response to a determination that process 1900 is complete, process 1900 ends. In response to a determination that process 1900 is not complete, process 1900 returns to 1905.

Figure 20:
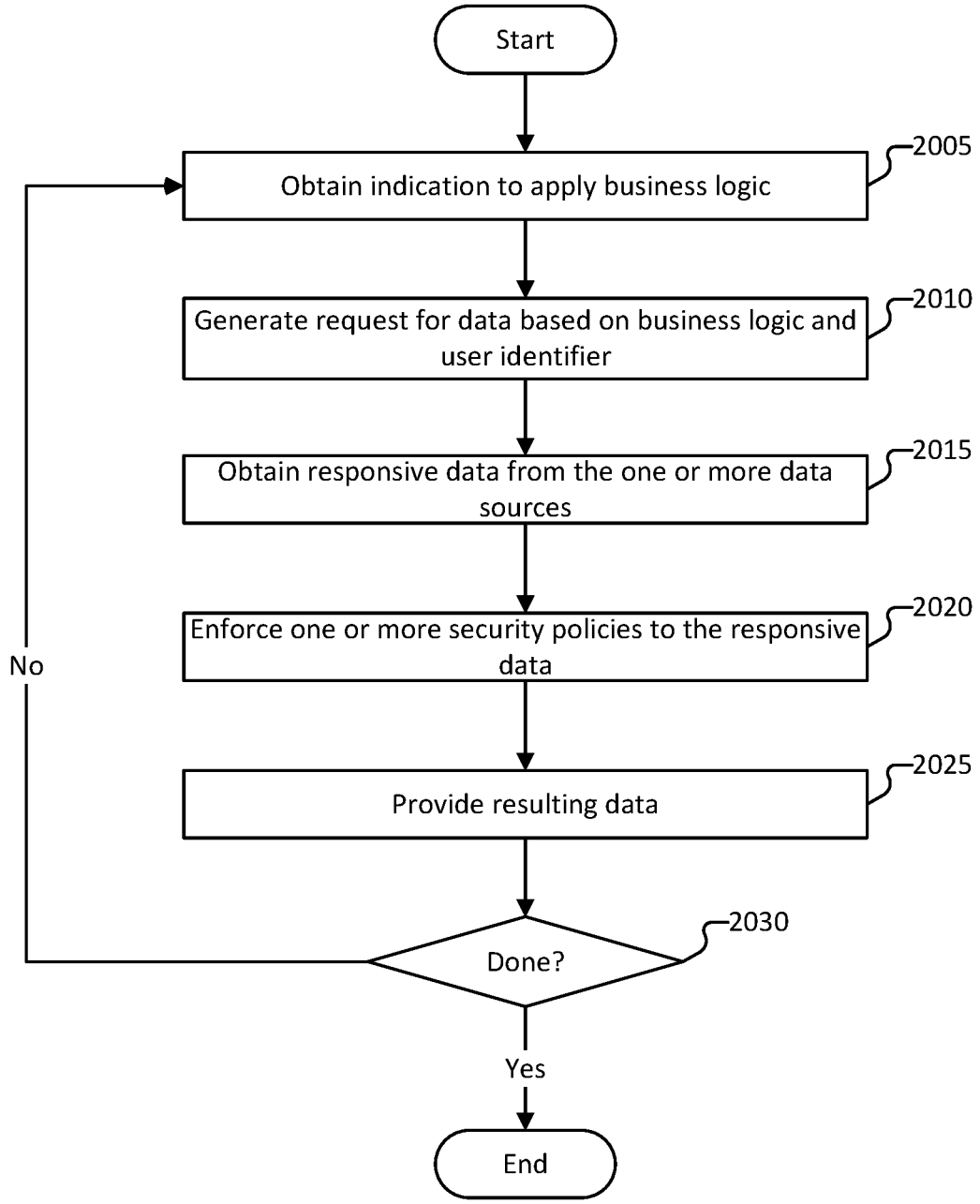
FIG. 20 is a flow diagram of a method for evaluating business logic in connection with providing a dataframe as a service according to various embodiments of the present application.

FIG. 20 is a flow diagram of a method for evaluating business logic in connection with providing a dataframe as a service according to various embodiments of the present application. In some embodiments, process 2000 is implemented at least in part by system 100 of FIG. 1 and/or system 200 of FIG. 2.

In some embodiments, process 2000 is invoked by 1620 of process 1600.

At 2005, an indication to apply business logic is obtained. In some embodiments, the system receives the indication to apply the business logic in connection with the client system providing a request for a result for the query associated with the business logic (e.g., a request for the system to run the business logic). At 2010, in response to receiving the indication to apply the business logic, the system generates a request for data based on the business logic and the user identifier (e.g., a credential associate with the user to enforce permissions and security policies). At 2015, the system obtains from the one or more data sources (e.g., the source data) responsive data (e.g., data that is responsive to the query). At 2020, in response to receiving the responsive data, the data enforces one or more security policies with respect to the responsive data. The one or more security policies may be enforce based at least in part on the user identifier. In some embodiments, the system enforces a policy to mask certain information, such as PII or other designated sensitive information. In various embodiments, the one or more security policies are enforced based at least in part on one or more of the following: not on a user identifier, on a user credential, on a user login credential, on a source data credential, on a user role, on a role credential, on an organization identifier, on an organization credential, or any other appropriate system identifier or credential associated with the user or system requestor. At 2025, the resulting data is provided. The system may provide the resulting data to another system that invoked process 2000 or to a client system that input the query. In some embodiments, the system configures a result dataframe that upon evaluation obtains the results for the query. At 2030, a determination is made as to whether process 2000 is complete. In some embodiments, process 2000 is determined to be complete in response to a determination that no further results are to be provided, no further queries are to be executed, no business logic for generating/obtaining a dataframe is received (e.g., within a threshold period of time), the processing of the evaluation of the business logic is complete, the user has exited the system, an administrator indicates that process 2000 is to be paused or stopped, etc. In response to a determination that process 2000 is complete, process 2000 ends. In response to a determination that process 2000 is not complete, process 2000 returns to 2005.

Figure 21:
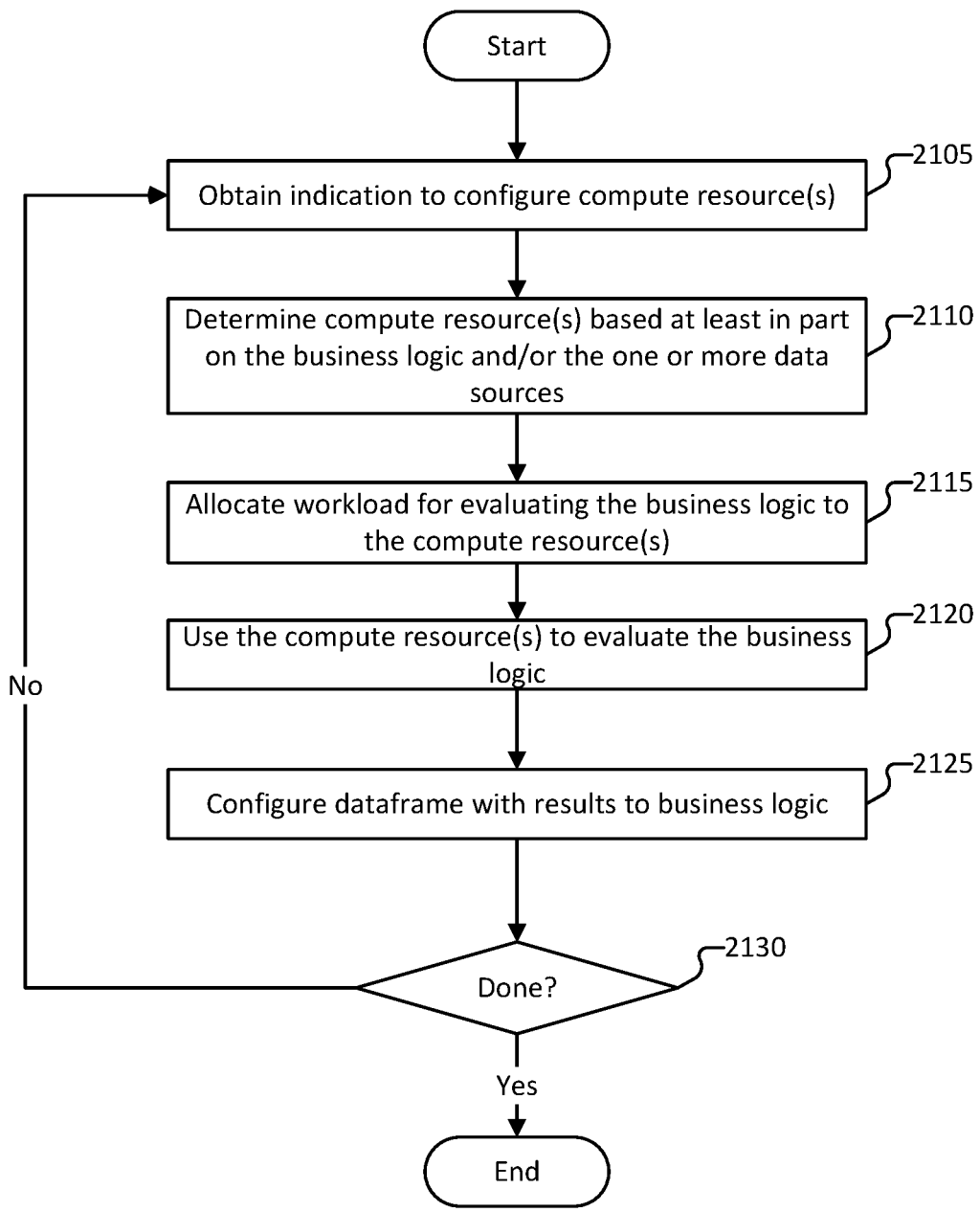
FIG. 21 is a flow diagram of a method for allocating compute resources in connection with providing a dataframe as a service according to various embodiments of the present application.

FIG. 21 is a flow diagram of a method for allocating compute resources in connection with providing a dataframe as a service according to various embodiments of the present application. In some embodiments, process 2100 is implemented at least in part by system 100 of FIG. 1 and/or system 200 of FIG. 2.

In some embodiments, process 2100 is invoked by 1620 of process 1600.

At 2105, an indication to configure a set of compute resources is obtained. In some embodiments, the system obtains the indication to configure the set of compute resources in response to a request to evaluate the query. At 2110, a set of compute resources is determined based at least in part on the business logic and the one or more data sources. In some embodiments, the set of compute resources is determined based at least in part on the type of source data, the volume of source data, and the particular transformations to be performed in evaluating the business logic. The system may determine the particular compute resources to include in the set of compute resources, such as a combination of one or more of reserved compute resources and spot market compute resources. At 2115, the workload for evaluating the business logic is allocated to the set of compute resources. At 2120, the set of compute resources are used to evaluate the business logic. For example, the system causes the set of compute resources to perform one or more transformations to the source data based at least in part on the business logic. At 2125, in response to evaluating the business logic, the system configures a dataframe with the results to the business logic. For example, the system obtains the results, configures the result dataframe, and stores the results to a dataset. At 2130, a determination is made as to whether process 2100 is complete. In some embodiments, process 2100 is determined to be complete in response to a determination that no further results are to be provided, no further queries are to be executed, no business logic for generating/obtaining a dataframe is received (e.g., within a threshold period of time), the processing of the evaluation of the business logic is complete, the user has exited the system, an administrator indicates that process 2100 is to be paused or stopped, etc. In response to a determination that process 2100 is complete, process 2100 ends. In response to a determination that process 2100 is not complete, process 2100 returns to 2105.

Figure 22:
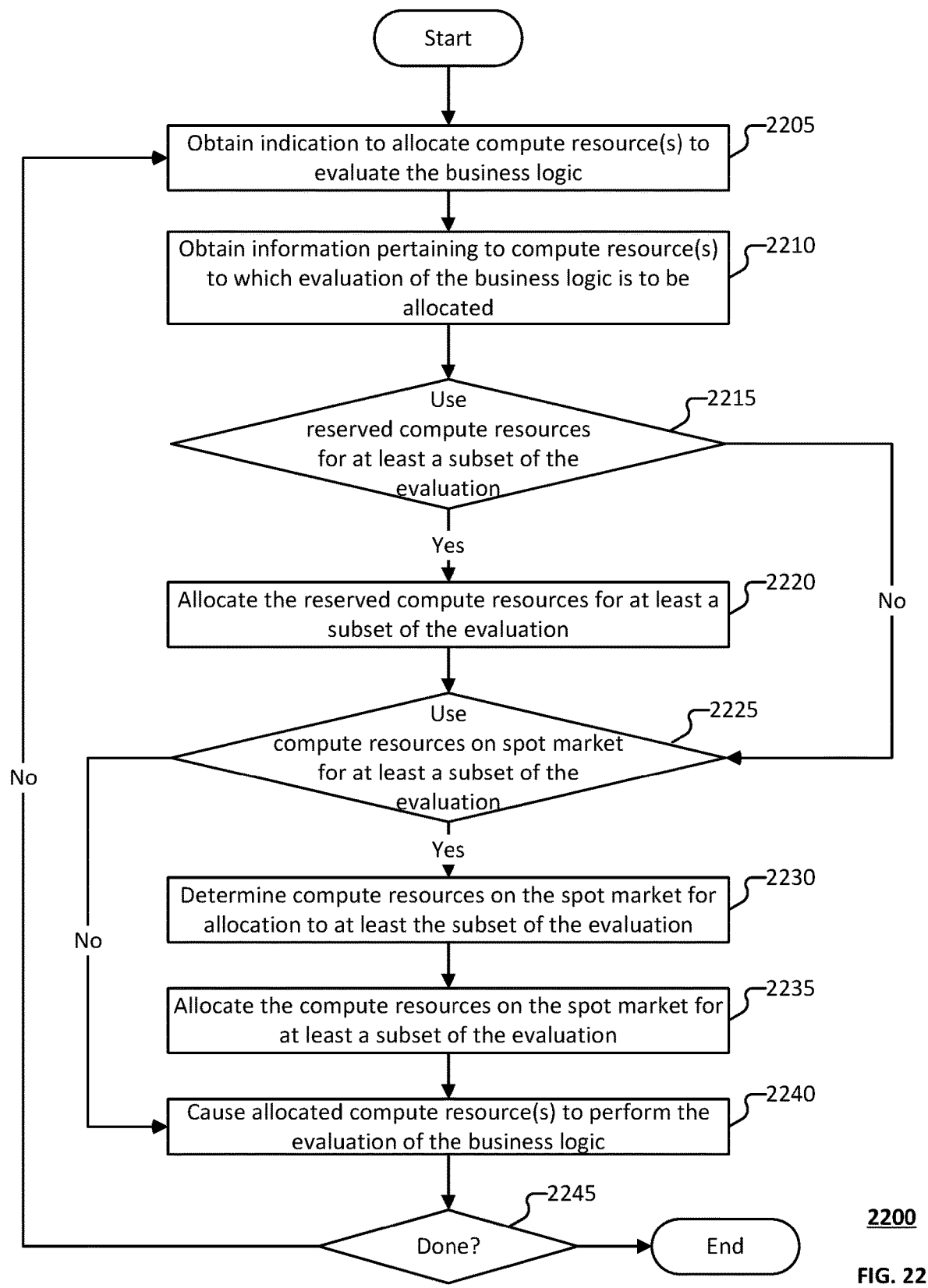
FIG. 22 is a flow diagram of a method for allocating compute resources in connection with providing a dataframe as a service according to various embodiments of the present application.

FIG. 22 is a flow diagram of a method for allocating compute resources in connection with providing a dataframe as a service according to various embodiments of the present application. In some embodiments, process 2200 is implemented at least in part by system 100 of FIG. 1 and/or system 200 of FIG. 2.

In some embodiments, process 2200 is invoked by 2115 of process 2100.

At 2205, an indication to allocate compute resources to evaluate the business logic is obtained. At 2210, in response to receiving the indication to allocate the set of compute resources, the system obtains information pertaining to the compute resource(s) to which evaluation of the business logic is to be allocated. For example, the system obtains configurations, state, and/or availability of the compute resources.

At 2215, the system determines whether to use reserved compute resources for at least a subset of the evaluation (e.g., of the business logic). In some embodiments, the system determines whether to use reserved compute resources based at least in part on an extent to which reserved compute resources are available for evaluating the business logic, a requirement pertaining to a time threshold within which the business logic is to be evaluated, etc. In response to determining to use the reserved compute resources for at least the subset of the evaluation at 2215, process 2200 proceeds to 2220. Conversely, in response to determining that the reserved compute resources are not to be used for at least a subset of the evaluation at 2215, process 2200 proceeds to 2225.

At 2220, the served compute resources are allocated for at least a subset of the evaluation. For example, the system determines particular reserved compute resources to be implemented and allocates the subset of the evaluation across such reserved compute resources.

At 2225, the system determines whether to use spot market compute resources for at least a subset of the evaluation (e.g., of the business logic). In some embodiments, the system determines whether to use spot market compute resources based at least in part on a compute resource policy. The compute resource policy may include one or more requirements for selecting spot market resources. For example, the system determines whether to use spot market compute resources based at least in part on availability, pricing, a time threshold in which a result for the business logic is to be provided, etc. In response to determining to use the spot market compute resources for at least the subset of the evaluation at 2225, process 2200 proceeds to 2230. Conversely, in response to determining that the spot market compute resources are not to be used for at least a subset of the evaluation at 2225, process 2200 proceeds to 2240.

At 2230, the set compute resources on the spot market to be allocated to at least a subset of the evaluation is determined. For example, the system may request spot market compute resources from a cloud service and obtain information pertaining to the spot market resources that are available to the dataframe service.

At 2235, the set of compute resources on the spot market are allocated for at least the subset of the evaluation.

At 2240, the system causes the compute resources to perform the evaluation of the business logic. For example, the system causes reserved compute resources and/or spot market compute resources that are allocated to at least a subset of the evaluation to evaluate the business logic.

At 2245, a determination is made as to whether process 2200 is complete. In some embodiments, process 2200 is determined to be complete in response to a determination that no further results are to be provided, no further queries are to be executed, no business logic for generating/obtaining a dataframe is received (e.g., within a threshold period of time), the processing of the evaluation of the business logic is complete, the user has exited the system, an administrator indicates that process 2200 is to be paused or stopped, etc. In response to a determination that process 2200 is complete, process 2200 ends. In response to a determination that process 2200 is not complete, process 2200 returns to 2205.

Figure 23:
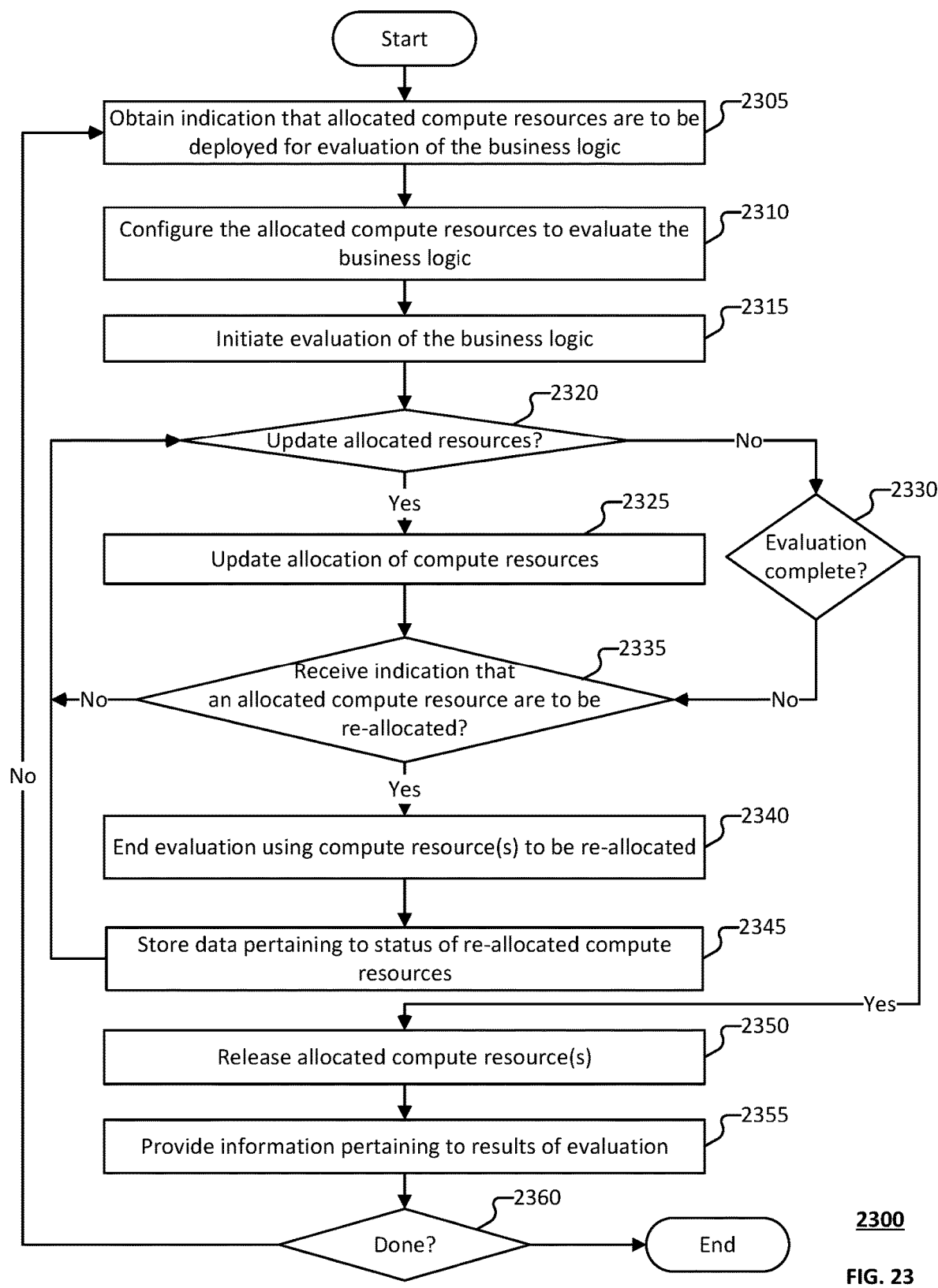
FIG. 23 is a flow diagram of a method for evaluating business logic in connection with providing a dataframe as a service according to various embodiments of the present application.

FIG. 23 is a flow diagram of a method for evaluating business logic in connection with providing a dataframe as a service according to various embodiments of the present application. In some embodiments, process 2300 is implemented at least in part by system 100 of FIG. 1 and/or system 200 of FIG. 2.

In some embodiments, process 2300 is invoked by 2240 of process 2200.

At 2305, an indication that allocated compute resources are to be deployed for evaluation of the business logic is received. In some embodiments, the system receives the indication in response to the system determining to cause the business logic to be evaluated.

At 2310, the allocated compute resources are configured to evaluate the business logic. In some embodiments, the system manages the instantiation or initialization of the allocated compute resources.

At 2315, the system initiates evaluation of the business logic.

At 2320, the system determines whether to update the allocated resources. For example, if the system determines that some of the allocated resources are to be allocated to evaluating a different query, or that a particular compute resource(s) fails, the system determines to update the allocated resources. As another example, the system determines to update the allocated resources in response to determining to accelerate evaluation of the business logic, such as through allocation of additional compute resources (e.g., in response to determining that additional compute resources are available). In response to determining to update the allocated resources a 2320, process 2300 proceeds to 2325. Conversely, in response to determining that allocated resources are not to be updated at 2320, process 2300 proceeds to 2325.

At 2325, the allocation of the compute resources is updated. For example, the allocation is updated based on a state of the compute resources, an availability of the allocated resources, or an availability of other resources that have not been allocated to evaluation of the business logic. Thereafter, process 2300 proceeds to 2335.

At 2330, the system determines whether the evaluation is complete. In response to determining that the evaluation is complete at 2300, process 2300 proceeds to 2350. Conversely, in response to determining that the evaluation is not complete at 2330, process 2300 proceeds to 2335.

At 2335, the system determines whether an indication that an allocated compute resource is to be reallocated. For example, in the case of the system having allocated a subset of the evaluation to spot market compute resources, because the availability of spot market compute resources may not be guaranteed and the cloud service/host may pull (e.g., revoke use of) spot market compute resources, the system may receive an indication (e.g., from the cloud service/host) that one or more allocated compute resources are to be reallocated. As another example, if the system determines to reallocate a compute resource, such as to process another query or perform a different function, the system may obtain an indication that an allocated resource is to be reallocated. In response to determining that the system receives the indication that an allocated compute resource is to be reallocated at 2335, process 2300 proceeds to 2340. Conversely, in response to determining that the system does not receive the indication that an allocated compute resource is to be reallocated at 2335, process 2300 returns to 2320 and process 2300 iterates through 2320-2335 until the system determines that the evaluation is complete.

At 2340, the system ends evaluation of the business logic using the compute resource to be reallocated. For example, the system suspends the work being performed by the compute resource that is to be reallocated.

At 2345, the system stores data pertaining to a status of the reallocated compute resources. For example, the system stores a state/progress of the work that was being performed by the reallocated compute resource. The system may use such state/progress in connection with resuming the processing by another compute resource or the same compute resource upon the compute resource becoming available once again. Thereafter, process 2300 returns to 2320 and process 2300 iterates through 2320-2345 until the system determines that the evaluation is complete.

At 2350, in response to determining that the evaluation is complete, the system releases the allocated compute resources. For example, the system ceases using any spot market compute resources to limit the costs for leasing/using the spot market resource. As another example, the system ceases using a reserved compute resource being used so that the reserved compute resource may be allocated to another workload.

At 2355, information pertaining to the results of the evaluation is provided. For example, the system provides the information pertaining to the results to the dataframe service or other process or module that invoked process 2300. The dataframe service may configure a result dataframe based at least in part on the information pertaining to the results of the evaluation.

At 2260, a determination is made as to whether process 2300 is complete. In some embodiments, process 2300 is determined to be complete in response to a determination that no further workloads are to be processed, no further results are to be provided, no further queries are to be executed, no business logic for generating/obtaining a dataframe is received (e.g., within a threshold period of time), the processing of the evaluation of the business logic is complete, the user has exited the system, an administrator indicates that process 2300 is to be paused or stopped, etc. In response to a determination that process 2300 is complete, process 2300 ends. In response to a determination that process 2300 is not complete, process 2300 returns to 2305.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   one or more processors configured to:
      receive, from a client system, one or more hints identifying parameters for source data;
      execute a plan for a source dataframe including:
         determining a data source storing the source data based at least in part on the one or more hints and one or more predefined rules or heuristics; and
         determining whether accessing the source data for the source dataframe is permitted based at least in part on one or more security policies,
         wherein the plan determined is based at least in part on the one or more hints;
      receive from the client system a business logic pertaining to a transformation to be applied to the source dataframe; and
      provide to the client system information pertaining to an execution result obtained based at least in part on the business logic; and
   a memory coupled to the one or more processors and configured to the one or more processors with instructions.

2. The system of claim 1, wherein a security policy of the one or more security policies comprises a user permission policy.

3. The system of claim 2, wherein a user permission policy comprises a user permission policy tied to login credentials.

4. The system of claim 2, wherein a user permission policy comprises a user permission policy tied to a data source credential.

5. The system of claim 2, wherein a user permission policy comprises a user permission policy tied to a role permission.

6. The system of claim 2, wherein a user permission policy comprises a user permission policy tied to an organization permission.

7. The system of claim 1, wherein determining whether accessing the source data for the source dataframe is permitted based at least in part on the one or more security policies occurs in conjunction with execution of the business logic.

8. The system of claim 1, wherein providing the information pertaining to the execution result includes determining whether accessing the execution result is permitted based at least in part on one or more security policies.

9. The system of claim 8, wherein determining whether accessing the execution result is permitted based at least in part on one or more security policies occurs in conjunction with execution of the business logic.

10. The system of claim 1, wherein the business logic comprises an expression of code.

11. The system of claim 10, wherein:
   executing the plan for the source dataframe includes determining, based at least in part on the expression of code, a programming language corresponding to the business logic; and
   the plan is executed based at least in part on a determination of the programming language corresponding to the business logic.

12. The system of claim 1, wherein at least one of the one or more security policies is enforced at the data source that stores the source data.

13. The system of claim 1, wherein the one or more processors are further configured to:
   in response to receiving the business logic, determine the execution result, wherein determining the execution result comprises enforcing a particular security policy with respect to the business logic.

14. The system of claim 13, wherein the enforcing the particular security policy with respect to the business logic comprises:
   determining whether the business logic comprises malicious code; and
   in response to determining that the business logic comprises code, preventing execution of at least part of the business logic.

15. A method, comprising:
   receiving, from a client system, one or more hints identifying parameters for source data;
   executing, using one or more processors, a plan for a source dataframe including:
      determining a data source storing the source data based at least in part on the one or more hints and one or more predefined rules or heuristics; and
      determining whether accessing the source data for the source dataframe is permitted based at least in part on one or more security policies,
      wherein the plan is determined based at least in part on the one or more hints;
   receiving from the client system a business logic pertaining to a transformation to be applied to the source dataframe; and
   providing to the client system information pertaining to an execution result obtained based at least in part on the business logic.

16. A system, comprising:
   one or more processors configured to:
      receive, from a client system, one or more hints identifying parameters for source data;
      execute a plan for a source dataframe, wherein:
         executing the plan for the source dataframe includes determining a data source storing the source data based at least in part on the one or more hints and one or more predefined rules or heuristics; and
         the plan is determined based at least in part on the one or more hints and the data source;

receive from the client system a business logic pertaining to a transformation to be applied to the source dataframe; and provide to the client system information pertaining to an execution result including determining whether accessing the execution result is permitted based at least in part on one or more security policies; and a memory coupled to the one or more processors and configured to the one or more processors with instructions.

17. The system of claim 16, wherein a security policy of the one or more security policies comprises a user permission policy.

18. The system of claim 17, wherein a user permission policy comprises a user permission policy tied to login credentials.

19. The system of claim 17, wherein a user permission policy comprises a user permission policy tied to a data source credential.

20. The system of claim 17, wherein a user permission policy comprises a user permission policy tied to a role permission.

21. The system of claim 17, wherein a user permission policy comprises a user permission policy tied to an organization permission.

22. The system of claim 16, wherein determining whether accessing the execution result is permitted based at least in part on the one or more security policies occurs in conjunction with execution of the business logic.

23. The system of claim 16, wherein executing a plan for a source dataframe includes determining whether accessing source data for the source dataframe is permitted based at least in part on one or more security policies.

24. The system of claim 23, wherein determining whether accessing source data for the source dataframe is permitted based at least in part on one or more security policies occurs in conjunction with execution of the business logic.

25. A method, comprising:

receiving, from a client system, one or more hints identifying parameters for source data;

executing, using one or more processors, a plan for a source dataframe, wherein:

executing the plan for the source dataframe includes determining a data source storing the source data based at least in part on the one or more hints and one or more predefined rules or heuristics; and the plan is determined based at least in part on the one or more hints and the data source;

receiving from the client system a business logic pertaining to a transformation to be applied to the source dataframe; and providing to the client system information pertaining to an execution result including determining whether accessing the execution result is permitted based at least in part on one or more security policies.

* * * * *